United States Patent
Ding et al.

(10) Patent No.: US 12,484,026 B2
(45) Date of Patent: Nov. 25, 2025

(54) WIRELESS COMMUNICATION METHOD AND TERMINAL

(71) Applicant: GUANGDONG OPPO MOBILE TELECOMMUNICATIONS CORP., LTD., Dongguan (CN)

(72) Inventors: Yi Ding, Dongguan (CN); Zhenshan Zhao, Dongguan (CN); Shichang Zhang, Beijing (CN); Huei-Ming Lin, Victoria (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 449 days.

(21) Appl. No.: 18/088,691

(22) Filed: Dec. 26, 2022

(65) Prior Publication Data
US 2023/0127136 A1 Apr. 27, 2023

Related U.S. Application Data

(63) Continuation of application No. PCT/CN2020/117914, filed on Sep. 25, 2020.

(51) Int. Cl.
*H04W 72/02* (2009.01)
*H04B 17/318* (2015.01)
(Continued)

(52) U.S. Cl.
CPC ......... *H04W 72/02* (2013.01); *H04W 72/044* (2013.01); *H04W 72/25* (2023.01)

(58) Field of Classification Search
CPC ..... H04W 72/02; H04W 72/25; H04W 92/18; H04W 28/26; H04W 4/40; H04W 72/0446; H04W 4/46; H04W 52/367; H04L 5/0005
(Continued)

(56) References Cited

U.S. PATENT DOCUMENTS

| | | | |
|---|---|---|---|
| 2011/0279244 A1* | 11/2011 | Park | H02J 50/90 320/108 |
| 2018/0205528 A1* | 7/2018 | Bai | H04L 5/0092 |

(Continued)

FOREIGN PATENT DOCUMENTS

| | | |
|---|---|---|
| CN | 108632781 A | 10/2018 |
| CN | 109644436 A | 4/2019 |

(Continued)

OTHER PUBLICATIONS

Communication pursuant to Article 94(3) EPC for European application 20954626.6 mailed Mar. 6, 2024.
(Continued)

*Primary Examiner* — Marcus Smith
*Assistant Examiner* — Jason A Harley
(74) *Attorney, Agent, or Firm* — Sheppard, Mullin, Richter & Hampton LLP

(57) ABSTRACT

The embodiments of the present disclosure provide a wireless communication method and a terminal, capable of improving the reliability of a communication system by means of cooperation between terminals. The method includes: transmitting, by a first terminal, a first indication to a second terminal, the first indication indicating a first resource set including a time-frequency resource selected by the first terminal or a time-frequency resource indicated by the first terminal via sidelink control information; receiving, by the first terminal, a second indication indicating a second resource set including a resource in the first resource set that satisfies or does not satisfy a first condition; and triggering, by the first terminal, resource reselection according to the second resource set.

20 Claims, 8 Drawing Sheets

| First Terminal | Second Terminal |
|---|---|

S1110: Transmit first indication indicating first resource set including time-frequency resource selected by first terminal or time-frequency resource indicated by first terminal via sidelink control information S1120: When priority of data to be transmitted by second terminal is higher than priority of data to be transmitted by first terminal, transmit second indication indicating second resource set including resource in first resource set that satisfies or does not satisfy first condition

(51) Int. Cl.
  *H04W 4/46* (2018.01)
  *H04W 72/04* (2023.01)
  *H04W 72/044* (2023.01)
  *H04W 72/25* (2023.01)
  *H04W 72/51* (2023.01)
  *H04W 72/563* (2023.01)
  *H04W 92/18* (2009.01)

(58) Field of Classification Search
  USPC .................................................. 370/330, 329
  See application file for complete search history.

(56) References Cited

U.S. PATENT DOCUMENTS

| | | | | |
|---|---|---|---|---|
| 2019/0223227 | A1* | 7/2019 | Jiang | H04L 5/0053 |
| 2019/0387377 | A1* | 12/2019 | Zhang | H04W 52/383 |
| 2021/0007096 | A1* | 1/2021 | Huang | H04L 1/1887 |
| 2021/0153167 | A1* | 5/2021 | Sarkis | H04W 72/56 |
| 2021/0243836 | A1* | 8/2021 | Wu | H04W 76/14 |
| 2022/0346118 | A1* | 10/2022 | Wu | H04L 5/0044 |
| 2023/0217504 | A1* | 7/2023 | Xiong | H04W 48/12 370/329 |

FOREIGN PATENT DOCUMENTS

| | | |
|---|---|---|
| CN | 110651515 A | 1/2020 |
| CN | 111246419 A | 6/2020 |
| WO | 2020011336 A1 | 1/2020 |

OTHER PUBLICATIONS

International Search Report and Written Opinion dated Jun. 23, 2021 in International Application No. PCT/CN2020/117914. English translation attached.

Huawei et al. "Remaining details of DCI format 3-1", 3GPP TSG RAN WG1 Meeting #100-e R1-2000184, Mar. 6, 2020 (Mar. 6, 2020), sections 1-3.

Qualcomm Inc. "Sidelink Resource Allocation Mode 2", 3GPP TSG RAN WG1 Meeting #101-e R1-2004452, Jun. 5, 2020 (Jun. 5, 2020), sections 1-5.

Apple. "Remaining Details on Resource Allocation for Mode 2", 3GPP TSG RAN WG1 #100-e R1-2000852, Mar. 6, 2020 (Mar. 6, 2020), sections 1-3.

OPPO. "Discussion on remaining open issue for mode 2", 3GPP TSG-RAN WG1 Meeting #100e R1-2000493, Mar. 6, 2020 (Mar. 6, 2020), sections 1-5.

3rd Generation Partnership Project; Technical Specification Group Radio Access Network; NR; Physical layer procedures for data(Release 16), 3GPP TS 38.214 V16.2.0, Jul. 20, 2020(Jul. 20, 2020), section 8.1.4.

Huawei et al. "Inter-UE coordination in sidelink resource allocation", 3GPP TSG RAN WG1 Meeting #102-e R1-2005255, Aug. 8, 2020(Aug. 8, 2020).

Moderator (LG Electronics). "Summary for AI 8.11.2.2 Feasibility and benefits for mode 2 enhancements", #3GPP TSG RAN WG1 #102-e R1-2007412, Sep. 4, 2020(Sep. 4, 2020).

European Search Report dated Jun. 19, 2023 received in European Patent Application No. EP20954626.6.

The Rejection notice from corresponding Chinese Application No. CN202310139034.8, dated Mar. 12, 2025. English translation attached.

Communication pursuant to Article 94(3) EPC for European application 20954626.6 mailed Feb. 27, 2025.

The First Office Action from corresponding Chinese Application No. CN202310139034.8, dated Jun. 20, 2024. English translation attached.

The Second Office Action from corresponding Chinese Application No. CN202310139034.8, dated Oct. 16, 2024. English translation attached.

Communication pursuant to Article 94(3) EPC for European application 20954626.6 mailed Aug. 16, 2024.

Communication pursuant to Article 94(3) EPC for European application 20954626.6 mailed Jul. 10, 2025.

\* cited by examiner

WIRELESS COMMUNICATION METHOD AND TERMINAL

CROSS-REFERENCE TO RELATED APPLICATIONS

This application is a continuation of Patent Application No. PCT/CN2020/117914 filed on Sep. 25, 2020, the entire disclosure of which is incorporated herein by reference.

TECHNICAL FIELD

The embodiments of the present disclosure relate to communication technology, and more particularly, to a wireless communication method and a terminal.

BACKGROUND

Communication architectures such as Device to Device (D2D), Vehicle to Vehicle (V2V), and Vehicle to Everything (V2X) can provide communications between terminals based on Sidelink (SL) technology, which is different from traditional cellular systems where communication data is received or transmitted by via base stations. Such direct communication between terminals has higher spectral efficiency and lower transmission delay. For a terminal in the direct communication, how to select resources to improve communication reliability is a technical problem to be solved in the present disclosure.

SUMMARY

Embodiments of the present disclosure provide a wireless communication method and a terminal, capable of improving the reliability of a communication system by means of cooperation between terminals.

In a first aspect, a wireless communication method is provided. The method includes: transmitting, by a first terminal, a first indication to a second terminal, the first indication indicating a first resource set including a time-frequency resource selected by the first terminal or a time-frequency resource indicated by the first terminal via sidelink control information; receiving, by the first terminal, a second indication indicating a second resource set including a resource in the first resource set that satisfies or does not satisfy a first condition; and triggering, by the first terminal, resource reselection according to the second resource set.

In a second aspect, a wireless communication method is provided. The method includes: receiving, by a second terminal, a first indication transmitted by the first terminal, the first indication indicating a first resource set including a time-frequency resource selected by the first terminal or a time-frequency resource indicated by the first terminal via sidelink control information; determining, by the second terminal, a second resource set including a resource in the first resource set that satisfies or does not satisfy a first condition; and transmitting, by the second terminal, a second indication to the first terminal, the second indication indicating the second resource set.

In a third aspect, a wireless communication method is provided. The method includes: transmitting, by a first terminal, a first indication to a second terminal, the first indication indicating a first resource set including a time-frequency resource selected by the first terminal or a time-frequency resource indicated by the first terminal via sidelink control information.

In a fourth aspect, a wireless communication method is provided. The method includes: receiving, by a second terminal, a first indication transmitted by the first terminal, the first indication indicating a first resource set including a time-frequency resource selected by the first terminal or a time-frequency resource indicated by the first terminal via sidelink control information; and transmitting, by the second terminal when there is a resource in the first resource set that satisfies the first condition, a second indication to the first terminal, the second indication indicating a second resource set including a resource in the first resource set that satisfies or does not satisfy the first condition.

In a fifth aspect, a wireless communication method is provided. The method includes: receiving, by a second terminal, a first indication transmitted by the first terminal, the first indication indicating a first resource set including a time-frequency resource selected by the first terminal or a time-frequency resource indicated by the first terminal via sidelink control information; and transmitting, by the second terminal when a priority of data to be transmitted by the second terminal is higher than a priority of data to be transmitted by the first terminal, a second indication to the first terminal, the second indication indicating a second resource set including a resource in the first resource set that satisfies or does not satisfy the first condition.

In a sixth aspect, a terminal is provided. The terminal device includes a processor and a memory. The memory stores a computer program, and the processor is configured to invoke and execute the computer program stored in the memory to perform the method according to any of the above first to fifth aspects or any implementation thereof.

In a seventh aspect, an apparatus is provided. The apparatus is configured to perform the method according to any of the above first to fifth aspects or any implementation thereof.

In particular, the apparatus includes a processor configured to invoke and execute a computer program from a memory, to cause a device provided with the apparatus to perform the method according to any of the above first to fifth aspects or any implementation thereof.

In an eighth aspect, a computer-readable storage medium is provided. The computer-readable storage medium stores a computer program that causes a computer to perform the method according to any of the above first to fifth aspects or any implementation thereof.

In a ninth aspect, a computer program product is provided. The computer program product includes computer program instructions that cause a computer to perform the method according to any of the above first to fifth aspects or any implementation thereof.

In a tenth aspect, a computer program is provided. The computer program, when executed on a computer, causes the computer to perform the method according to any of the above first to fifth aspects or any implementation thereof.

With the technical solutions according to the first aspect or the second aspect, the first terminal can identify overlapping resources having a half-duplex problem or interference, thereby triggering resource reselection for such resources to improve the reliability of the communication system.

With the technical solutions according to the third aspect, the fourth aspect or the fifth aspect, while ensuring the reliability of the communication system, the signaling overhead between the first terminal and the second terminal can also be reduced.

DETAILED DESCRIPTION

The technical solutions in the embodiments of the present disclosure will be described below with reference to the figure in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The internet of vehicles system adopts direct terminal-to-terminal communication. Two transmission modes are defined in the $3^{rd}$ Generation Partnership Project (3GPP): Mode 1 and Mode 2.

Figure 1A:
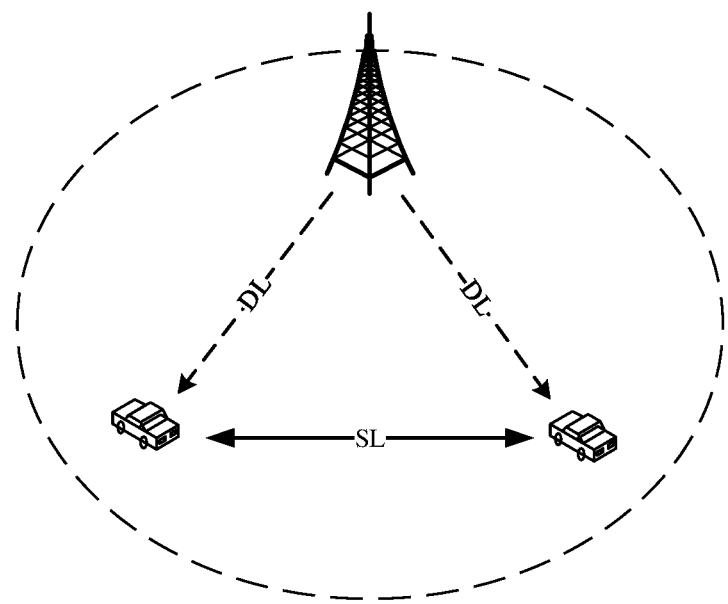
FIG. 1A is a schematic diagram showing a first mode according to the present disclosure.

Mode 1: As shown in FIG. 1A, transmission resources of a terminal are allocated by a network device, and the terminal transmits data on a sidelink according to the resources allocated by the network device. The network device can allocate resources for a single transmission to the terminal. The terminal can also be allocated semi-static transmission resources.

Figure 1B:
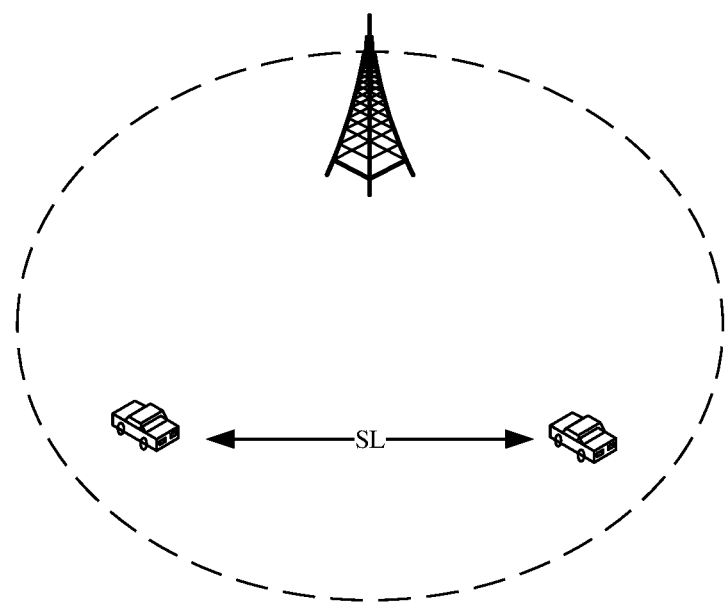
FIG. 1B is a schematic diagram showing a second mode according to the present disclosure.

Mode 2: As shown in FIG. 1B, the terminal autonomously selects a resource in a resource pool to transmit data. Specifically, the terminal may select a transmission resource from the resource pool by means of listening, or select a transmission resource from the resource pool by means of random selection.

The technical solution of the present disclosure can be applied in the above Mode 1, and the relevant knowledge involved in the technical solution of the present disclosure will be introduced below.

1. New Radio (NR) V2X Physical Layer Structure:

In NR V2X, a Physical Sidelink Control Channel (PSCCH) and a Physical Sidelink Shared Channel (PSSCH) are involved. The PSCCH is used to transmit first sidelink control information, which will be described below. The PSSCH is used to transmit data and second sidelink control information which mainly includes fields related to data demodulation such that other terminals can demodulate the data in the PSSCH.

Figure 2:
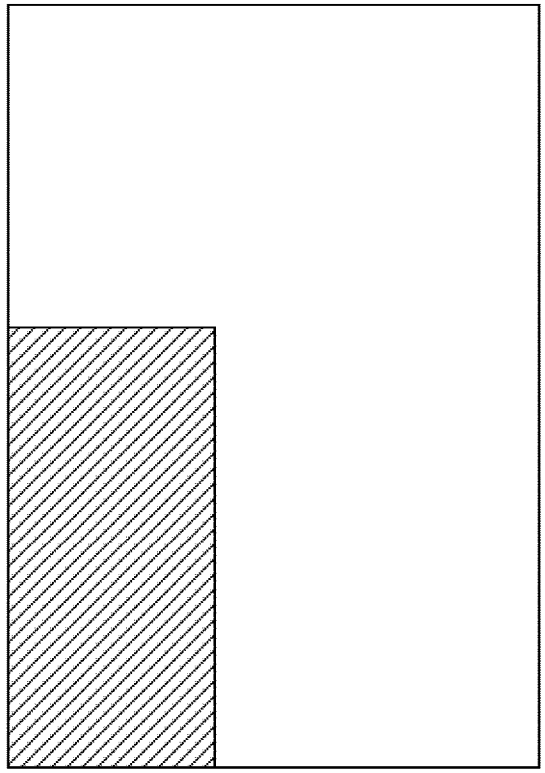
FIG. 2 is a schematic diagram showing an NR V2X physical layer structure according to the present disclosure.
Figure 2:
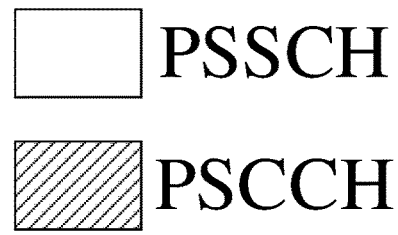

The relationship between the PSCCH and the PSSCH is as follows: PSCCH and PSSCH are continuous in the same time slot and do not overlap each other. Meanwhile, the PSCCH and PSSCH are continuous in frequency domain and do not overlap each other. This means that the PSCCH and the PSSCH must be transmitted at the same time. FIG. 2 is a schematic diagram showing an NR V2X physical layer structure according to the present disclosure. As shown in FIG. 2, a terminal transmits a PSCCH, and a PSSCH scheduled by the PSCCH is a PSSCH transmitted by the terminal simultaneously with the PSCCH.

Figure 3:
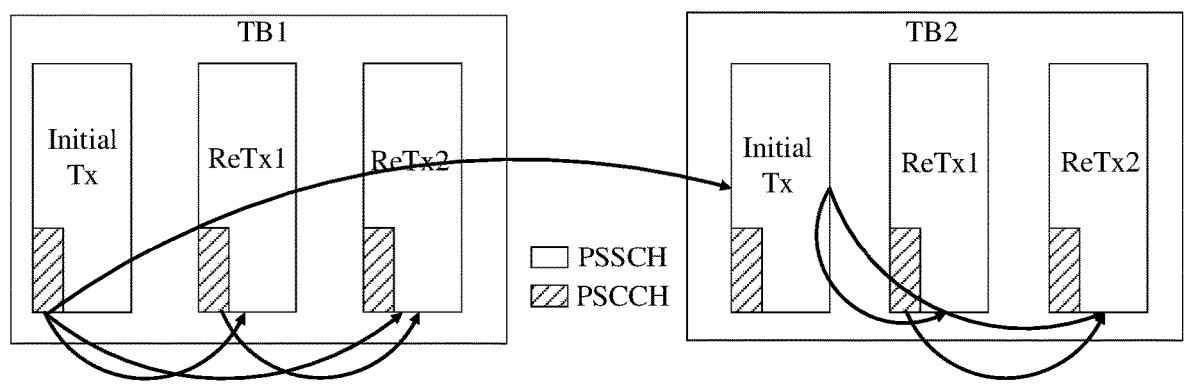
FIG. 3 is a schematic diagram showing resource reservation according to the present disclosure.

2. Resource Reservation in NR-V2X:

In NR-V2X, in the above Mode 2, a terminal autonomously selects resources to transmit data. Resource reservation is the premise of resource selection. Resource reservation means that the terminal reserves resources to be used via sidelink control information in a PSCCH. In NR-V2X, both intra-TB resource reservation and inter-TB resource reservation are supported, as shown in FIG. 3: The terminal transmits the first sidelink control information, and uses Time Resource Assignment and Frequency Resource Assignment fields therein to indicate N time-frequency resources of the current TB (including the resources currently used by the terminal for transmission), where N≤Nmax. In NR V2X, Nmax is equal to 2 or 3. Meanwhile, the above N indicated time-frequency resources should be distributed in W time slots. In NR V2X, W is equal to 32. For example, as shown in FIG. 3, in TB 1, the terminal transmits the first sidelink control information in the PSCCH while transmitting initial transmission data on the PSSCH, and uses the above two fields to indicate the time-frequency resource positions of the initial transmission, Retransmission 1 and Retransmission 2 (i.e., N=3 in this case). The time-frequency resources for the initial transmission are the resources currently used by the terminal for transmission, and the time-frequency resources for Retransmission 1 and Retransmission 2 are resources reserved in TB1. The initial transmission, Retransmission 1 and Retransmission 2 are distributed in 32 time slots in the time domain.

Optionally, when the terminal transmits the first sidelink control information, a resource reservation period is used for inter-TB resource reservation. For example, as shown in FIG. 3, when transmitting the first sidelink control information for the initial transmission of TB 1, the terminal uses Time Resource Assignment and Frequency Resource Assignment fields to indicate the time-frequency resource positions of the initial transmission, Retransmission 1 and Retransmission 2 of TB 1, denoted as $\{(t_1, f_1), (t_2, f2), (t_3, f_3)\}$. Here, $t_1$, $t_2$, and $t_3$ represent the time domain resource positions of the initial transmission, Retransmission 1 and Retransmission 2 of TB 1, respectively, and $f_1$, $f_2$, and $f_3$ represent the corresponding frequency domain resource positions. If the value of the "Resource reservation period" field in the first sidelink control information is 100 milliseconds, the first sidelink control information also indicates time-frequency resources $\{(t_1+100, f_1), (t_2+100, f_2), (t_3+100, f_3)\}$, which are used for the initial transmission, Retransmission 1 and Retransmission 2 of TB 2. In NR V2X, the possible values of the "Resource reservation period" field are 0, 1-99, 100, 200, 300, 400, 500, 600, 700, 800, 900, 1000 milliseconds, which is more flexible than LTE V2X. However, in each resource pool, only e values therein are configured, and the terminal determines the possible values according to the resource pool used. The e values in the resource pool configuration constitute a resource reservation period set M. Here, exemplarily, e may be smaller than or equal to 16.

In addition, the above inter-TB reservation can be activated or deactivated in units of resource pools by means of network configuration or pre-configuration. When the inter-TB reservation is deactivated, the "Resource reservation period" field is not included in the first sidelink control information. In general, before triggering the resource reselection, the value of the "Resource reservation period" field used by the terminal, that is, the resource reservation period, will not change. Each time the terminal transmits the first sidelink control information, it uses the "Resource reservation period" field therein to reserve resources for the next period for transmission of another TB, thereby achieving periodic semi-persistent transmission.

When any terminal operates in the above Mode 2, the terminal can obtain the first sidelink control information transmitted by another terminal by detecting the PSCCH transmitted by the other terminal, so as to know the resources reserved by the other terminal. When the terminal selects a resource, it will exclude the resources reserved by other terminal, thereby avoiding resource collision.

3. In the above Mode 2, the terminal needs to select resources autonomously. In the following, the resource listening window, resource selection window and resource selection method in NR-V2X will be introduced.

Figure 4A:
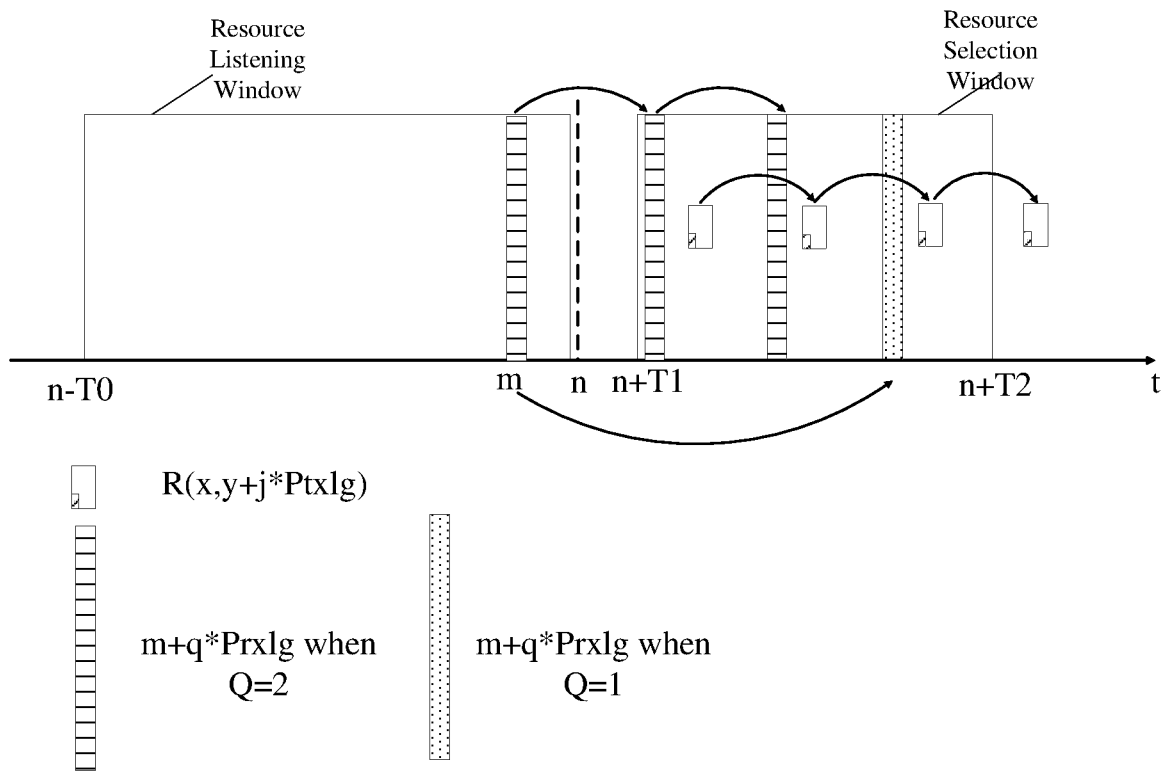
FIG. 4A is a first schematic diagram showing a resource distribution according to the present disclosure.
Figure 4B:
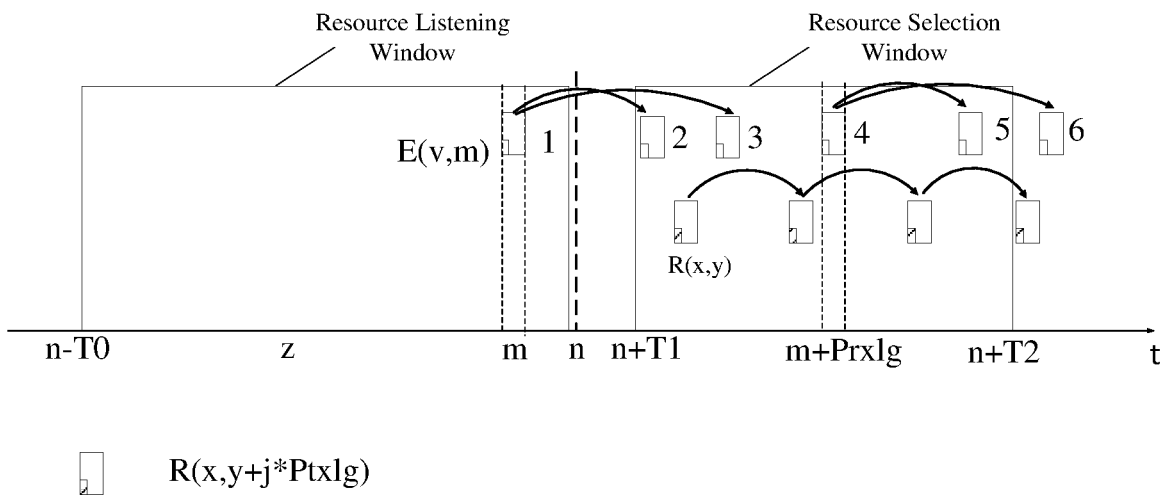
FIG. 4B is a second schematic diagram showing a resource distribution according to the present disclosure.

Definition of resource selection window: As shown in FIG. 4, the terminal needs to select or reselect resources in time slot n, and the resource selection window starts from n+T1 and ends at n+T2. $0 \leq T1 \leq T_{proc,1}$, where $T_{proc,1}$ is 3, 5, 9, and 17 time slots when the subcarrier spacing is 15, 30, 60, or 120 kHz, respectively. $T2_{min} \leq T2 \leq$ remaining delay budget of service, the value set of $T2_{min}$ is $\{1, 5, 10, 20\}*2\mu$ timeslots, where $\mu=0, 1, 2,$ or 3, corresponding to subcarrier spacing of 15, 30, 60, and 120 kHz, respectively. The terminal determines $T2_{min}$ from a set of values according to a priority of data to be transmitted by the terminal. For example, when the subcarrier spacing is 15 kHz, the terminal determines $T2_{min}$ from the set $\{1, 5, 10, 20\}$ according to the priority of the data to be transmitted by the terminal. When $T2_{min}$ is greater than or equal to the remaining delay budget of the service, T2 is equal to the remaining delay budget of the service. The remaining delay budget is a difference between a data delay requirement and the current time. For example, for a data packet arriving at time slot n, the delay requirement is 50 milliseconds. Assuming that one time slot is 1 millisecond, if the current time is time slot n, the remaining delay budget is 50 milliseconds. If the current time is time slot n+20, the remaining delay budget is 30 milliseconds.

Definition of the resource listening window: The terminal performs resource listening from n−T0 to n−$T_{proc,0}$, and the value of T0 is 100 or 1100 milliseconds. When the subcarrier spacing is 15, 30, 60, or 120 kHz, $T_{proc,0}$ is 1, 1, 2, and 4 time slots. In fact, the terminal detects the first sidelink control information transmitted by another terminal in each time slot. After time slot n triggers the resource selection or reselection, the terminal uses the resource listening result from n−T0 to n−$T_{proc,0}$.

Resource Selection Process:

Step 1: The terminal takes all available resources belonging to the resource pool used by the terminal within the resource selection window as a resource set A, and any resource in the set A is denoted as R(x, y), where x and y denote the frequency domain position and time domain position of the resource. The initial number of resources in the set A is $M_{total}$.

Step 1-1: If the terminal transmits data in time slot m within the resource listening window without listening, the terminal determines whether time slots m+q*Prxlg and resources R(x,y+j*Ptxlg) overlap, and if so, removes the resource R(x, y) from the resource set A. That is, the resource that may be reserved by the terminal transmitting data in the time slot m overlaps with the resources R(x, y+j*Ptxlg), and there is a resource collision problem. Here, j=0, 1, 2, 3 . . . C−1, where C is determined by a random value counter generated by the terminal. When the terminal selects a resource, it will randomly generate a counter value (a positive integer) to determine how many periods the selected resource is to be reserved. Ptxlg is the number obtained by converting Ptx into logical time slots, and Ptx is the resource reservation period determined by the terminal for resource selection, and is one of the values in the resource reservation period set M in the resource pool configuration used by the terminal, which is also the value indicated by the "Resource reservation period" field in the first sidelink control information of the terminal when the terminal performing the resource selection transmits data after completing the resource selection. Therefore, the resources R(x, y+j*Ptxlg) are a series of resources marked with small rectangles with partial diagonal lines in FIG. 4A. For time slots m+q*Prxlg, where q=1, 2, 3 . . . Q, and Prxlg is the number obtained by converting Prx into logical time slots. Prx is the resource reservation period indicated by "Resource reservation period" in the first sidelink control information transmitted in the PSCCH as detected by the terminal. Since the terminal does not listen in the time slot m, here Prx is all possible values in the resource reservation period set M in the resource pool configuration used by the terminal, that is, the terminal will determine whether the time slots m+q*Prxlg calculated based on each value in M overlap with the resources R(x,y+j*Ptxlg). For Q, if Prx<Tscal and n−m<=Prxlg, Q=⌈Tscal/Prx⌉ (representing ceiling operation), or otherwise Q=1. Tscal is equal to the value in milliseconds corresponding to T2. For example, the terminal does not listen in the time slot m, and sequentially selects Prx from the resource reservation period set M in the used resource pool configuration for resource exclusion. For a certain Prx, if Prx<Tscal and n−m<=Prxlg, assuming that the Q value is calculated as 2, then the time slots m+q*Prxlg are next two time slots marked with horizontal lines mapped by the time slot m in FIG. 4A, otherwise Q=1, and the time slots m+q*Prxlg are the time slots marked with dots in FIG.

4A. Optionally, when the resource pool used by the terminal deactivates the inter-TB reservation, the terminal may not perform the above step 1-1.

Step 1-2: If the terminal detects the first sidelink control information transmitted in the PSCCH on the resource E(v, m) in the time slot m within the listening window (v is the frequency domain position of the resource), it measures the Sidelink Reference Signal Received Power (SL-RSRP) of the PSCCH or the SL-RSRP of the PSSCH scheduled by the PSCCH (that is, the SL-RSRP of the PSSCH transmitted simultaneously with the PSCCH). If the measured SL-RSRP is greater than an SL-RSRP threshold, and the resource pool used by the terminal activates inter-TB resource reservation, then the terminal assumes that the first sidelink control information with the same content has been received on the timeslots m+q*Prxlg. Here, q=1, 2, 3 . . . Q, for Q, if Prx<Tscal and n−m<=Prxlg, Q=⌈ Tscal/Prx⌉ (representing ceiling operation), otherwise Q=1. Tscal is equal to the value in milliseconds corresponding to T2. Prxlg is the number obtained by converting Prx into logical time slots, and Prx is the resource reservation period indicated by "Resource reservation period" in the first sidelink control information transmitted in the PSCCH as detected by the terminal. The terminal determines whether the resources indicated by the "Time resource assignment" and "Frequency resource assignment" fields in the first sidelink control information received in the time slot m and Q instances of first sidelink control information that are assumed to be received overlap with the resources R(x, y+j*Ptxlg), that is, whether there is a resource collision between the detected resources and the resources R(x,y+j*Ptxlg). If so, the corresponding resource R(x, y) will be excluded from the set A. The above j=0, 1, 2, 3 . . . C−1,C are determined by a random counter value generated by the terminal. Ptxlg is the number obtained by converting Ptx into logical time slots, and Ptx is the resource reservation period determined by the terminal performing resource selection. For example, the resources R(x, y+j*Ptxlg) are a series of resources marked with small rectangles with partial diagonal lines in FIG. 4B. If the terminal detects the first sidelink control information in the PSCCH on the resource E(v, m) in the time slot m, and decodes Prx>Tscal and calculates Q=1, the terminal will assume that the first sidelink control information with the same content has been received in the time slots m+Prxlg. The terminal determines whether Resources 1, 2, 3, 4, 5, 6 indicated by the "Time resource assignment" and "Frequency resource assignment" fields of the first sidelink control information received in the time slot m and the first sidelink control information assumed to be received in the time slots m+Prxlg overlap with the resources R(x,y+j*Ptxlg), where Resource 1 is the resource E(v,m). If so, the resource R(x, y) is excluded from the resource set A. If the SL-RSRP measured by the terminal is greater than the SL-RSRP threshold, and the resource pool used by the terminal deactivates the inter-TB resource reservation, the terminal only determines whether the resource indicated by the "Frequency resource assignment" and "Time resource assignment" fields of the first sidelink control information received in the time slot m overlaps with the resources R(x, y+j*Ptxlg). If so, the resource R(x, y) is excluded from the resource set A.

If the remaining resources in the resource set A are less than $M_{total}$*X % after the above resource exclusion, the SL-RSRP threshold is increased by 3 dB, and the process goes back to Step 1. The terminal takes the resource set A after the resource exclusion as a candidate resource set.

Step 2: The terminal randomly selects a resource from the candidate resource set to transmit data.

It should be noted:

1. The above RSRP threshold is determined by a priority P1 carried in the PSCCH detected by the terminal and a priority P2 of data to be transmitted by the terminal. The resource pool configuration used by the terminal includes an SL-RSRP threshold table, which includes SL-RSRP thresholds corresponding to all priority combinations. The resource pool configuration can be configured by the network or pre-configured.

For example, as shown in Table 1, assuming that the selectable priorities of P1 and P2 are both 0-7, the SL-RSRP thresholds corresponding to different priority combinations are represented by γij, where i is the value of the priority P1, and j is the value of the priority P2.

TABLE 1

| P2 | P1 | | | | | | | |
|---|---|---|---|---|---|---|---|---|
| | 0 | 1 | 2 | 3 | 4 | 5 | 6 | 7 |
| 0 | $\gamma_{00}$ | $\gamma_{01}$ | $\gamma_{02}$ | $\gamma_{03}$ | $\gamma_{04}$ | $\gamma_{05}$ | $\gamma_{06}$ | $\gamma_{07}$ |
| 1 | $\gamma_{10}$ | $\gamma_{11}$ | $\gamma_{12}$ | $\gamma_{13}$ | $\gamma_{14}$ | $\gamma_{15}$ | $\gamma_{16}$ | $\gamma_{17}$ |
| 2 | $\gamma_{20}$ | $\gamma_{21}$ | $\gamma_{22}$ | $\gamma_{23}$ | $\gamma_{24}$ | $\gamma_{25}$ | $\gamma_{26}$ | $\gamma_{27}$ |
| 3 | $\gamma_{30}$ | $\gamma_{31}$ | $\gamma_{32}$ | $\gamma_{33}$ | $\gamma_{34}$ | $\gamma_{35}$ | $\gamma_{36}$ | $\gamma_{37}$ |
| 4 | $\gamma_{40}$ | $\gamma_{41}$ | $\gamma_{42}$ | $\gamma_{43}$ | $\gamma_{44}$ | $\gamma_{45}$ | $\gamma_{46}$ | $\gamma_{47}$ |
| 5 | $\gamma_{50}$ | $\gamma_{51}$ | $\gamma_{52}$ | $\gamma_{53}$ | $\gamma_{54}$ | $\gamma_{55}$ | $\gamma_{56}$ | $\gamma_{57}$ |
| 6 | $\gamma_{60}$ | $\gamma_{61}$ | $\gamma_{62}$ | $\gamma_{63}$ | $\gamma_{64}$ | $\gamma_{65}$ | $\gamma_{66}$ | $\gamma_{67}$ |
| 7 | $\gamma_{70}$ | $\gamma_{71}$ | $\gamma_{72}$ | $\gamma_{73}$ | $\gamma_{74}$ | $\gamma_{75}$ | $\gamma_{76}$ | $\gamma_{77}$ |

When the terminal detects the PSCCH transmitted by another terminal, it obtains the priority P1 carried in the first sidelink control information transmitted in the PSCCH and the priority P2 of the data to be transmitted, and the terminal determines the SL-RSRP threshold by looking up Table 1.

2. Whether the terminal uses the measured SL-RSRP of the PSCCH or the SL-RSRP of the PSSCH scheduled by the PSCCH for comparison with the SL-RSRP threshold depends on the resource pool configuration of the resource pool used by the terminal. The resource pool configuration can be configured by the network or pre-configured.

3. Regarding the above Prxlg/Ptxlg being the number obtained by converting Prx/Ptx into logical time slots: assuming that a time slot is equal to 1 millisecond and Prx is 5 milliseconds, among these 5 time slots, 2 time slots may be downlink slots in the TDD mode or time slots for transmission of synchronization signals, and are not included in the SL resource pool, so it is necessary to convert the 5 milliseconds represented by Prx into three logical time slots, namely Prxlg.

4. For the above X %, the possible values of X may be {20, 35, 50}. The resource pool configuration used by the terminal includes a correspondence between priorities and the above possible values, and the terminal determines the value of X according to the priority of the data to be transmitted and the correspondence. The resource pool configuration can be configured by the network or pre-configured.

Figure 5:
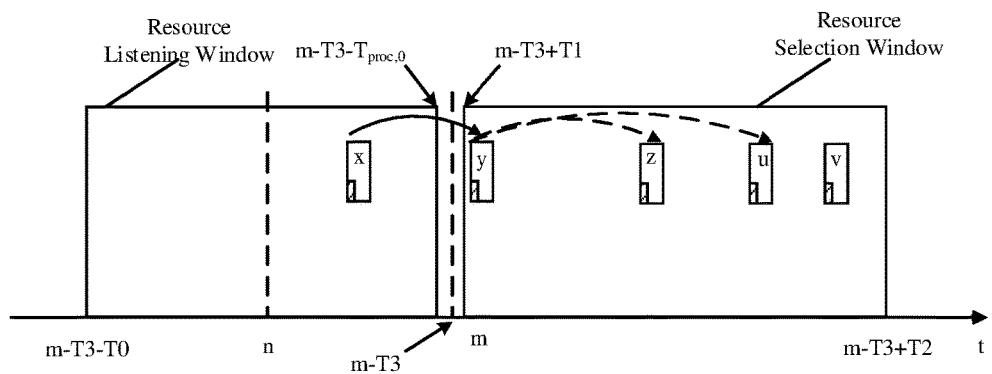
FIG. 5 is a third schematic diagram showing a resource distribution according to the present disclosure.

4. Resource Reselection Based on Resource Re-Evaluation:

The NR-V2X also supports re-evaluation of resources that have been selected but not indicated by transmitting the first sidelink control information after the terminal completes resource selection. As shown in FIG. 5, Resources x, y, z, u, and v are time-frequency resources selected by the terminal in time slot n, and Resource y is located in time slot m. For the resources z and u that the terminal is to indicate for the first time by transmitting the first sidelink control information in Resource y (Resource y has been indicated by the first sidelink control information in Resource x previously), the dashed arrow in FIG. 5 represents indication by the first sidelink control information to be transmitted, and the solid arrow in FIG. 5 represents indication by the first sidelink control information that has been transmitted. In order to prevent resource collision, the terminal performs the above Step 1 at least once in the time slot m−T3, that is, at least in the time slot m−T3, determines the resource selection window and the resource listening window as described above, and performs the above Step 1 to exclude resources from the resource selection window, so as to obtain a candidate resource set. If Resource z or u is not in the candidate resource set, the terminal performs the above Step 2 to reselect time-frequency resources in the candidate resource set. Depending on the implementation of the terminal, the terminal can also reselect any resource in the candidate resource set that has been selected but not indicated by transmitting the first sidelink control information. For example, if u and v are in the candidate resource set, any one or more of Resources u or v can be selected. T3 above is equal to $T_{proc,1}$.

5. Resource Reselection Based on Resource Preemption:

The NR-V2X supports a resource preemption mechanism. In the NR-V2X, the conclusions about the resource preemption mechanism are all described from the perspective of the terminal having resources preempted. After the resource selection is completed, the terminal continues to listen to the first sidelink control information. If the time-frequency resource that has been selected and indicated by transmitting the first sidelink control information satisfies the following three conditions, it means that the time-frequency resource is preempted by another terminal, and the terminal triggers resource reselection for the time-frequency resource:

1. The resource reserved in the detected first sidelink control information overlaps, either fully or partially, with the resource selected and indicated by the terminal.
2. The SL-RSRP of the PSCCH corresponding to the first sidelink control information detected by the terminal or the SL-RSRP of the PSSCH scheduled by the PSCCH is greater than the SL RSRP threshold.
3. The priority carried in the detected first sidelink control information is higher than the priority of the data to be transmitted by the terminal.

Optionally, the priority in the present disclosure corresponds to a numerical value. For example, for a priority of 1, 1 indicates the numerical value corresponding to the priority, and the smaller the numerical value is, the higher the priority will be, or the smaller the numerical value is, the lower the priority will be. The present disclosure is not limited to any of these examples.

Figure 6:
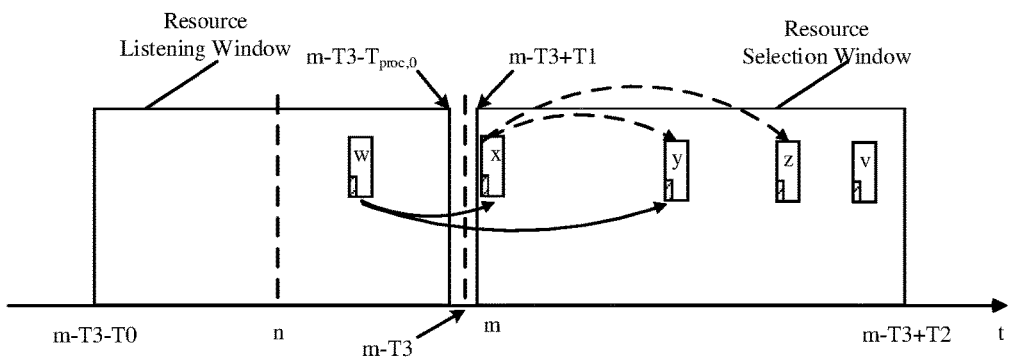
FIG. 6 is a fourth schematic diagram showing a resource distribution according to the present disclosure.

As shown in FIG. 6, Resources w, x, y, z, and v are time-frequency resources selected by the terminal in time slot n, and Resource x is located in time slot m. For the resources x and y that are to be indicated by the first sidelink control information to be transmitted by the terminal on Resource x and have been indicated by the first sidelink control information transmitted by the terminal previously, the terminal performs the above Step 1 at least once in the time slot m−T3, that is, at least in the time slot m−T3, determines the resource selection window and the resource listening window as described above, and performs the above Step 1 to exclude resources from the resource selection window, so as to determine the candidate resource set. If Resource x or y is not in the candidate resource set (satisfying the above conditions 1 and 2), it is further determined whether Resource x or y is not in the candidate resource set due to the indication of the first sidelink control information carrying the higher priority (satisfying the above condition 3). If so, the terminal performs Step 2, that is, for reselecting resources in the candidate resource set. In addition, after triggering the resource reselection, depending on the implementation of the terminal, the terminal may also reselect any resource that has been selected but not indicated by transmitting the first sidelink control information, e.g., any one or more of Resources z or v. T3 above is equal to $T_{proc,1}$.

The above SL-RSRP is a linear average value of the received power on all Resource Elements (REs) carrying a reference signal in the PSCCH or PSSCH, and the reference signal may be a Demodulation Reference Signal (DMRS) or a Channel State Information-Reference Signal (CSI-RS). When the PSSCH or PSCCH is transmitted using multiple antenna ports, the SL-RSRP is the sum of the SL-RSRPs measured for the respective antenna ports.

As described above, the first sidelink control information is carried in the PSCCH, and mainly includes fields related to resource listening, for other terminals to perform resource exclusion and resource selection after decoding. In the PSSCH, in addition to data, second sidelink control information is also carried. Therefore, as used hereinafter in the present disclosure, the sidelink control information in the PSCCH is the above first sidelink control information, and the sidelink control information in the PSSCH is the above second sidelink control information, which will not be repeated below.

It can be appreciated that the terminal in the embodiments of the present disclosure may refer to a User Equipment (UE), an access terminal, a user unit, a user station, a mobile station, a remote station, a remote terminal, a mobile device, a user terminal, a terminal, a wireless communication device, a user agent, or a user device. The terminal may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal in the next generation communication system (e.g., NR network), or a terminal in a future evolved Public Land Mobile Network (PLMN), etc.

As non-limiting examples, in an embodiment of the present disclosure, the terminal may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

The network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, or a network device in a future evolved PLMN.

It can be appreciated that the embodiments of the present disclosure are not only applicable to communication frameworks such as D2D, V2V and V2X, but also to any other terminal-to-terminal communication frameworks, and the embodiments of the present disclosure are not limited to any of these examples. The embodiments of the present disclosure may be applied to unlicensed spectrum or shared spectrum.

As mentioned above, in the above Mode 2, how to select resources to improve the reliability of the communication system is the technical problem to be solved in the present disclosure. In order to solve this technical problem, the inventive concept of the present disclosure is to select resources with cooperation between terminals.

The technical solutions of the present disclosure will be elaborated below.

Figure 7:
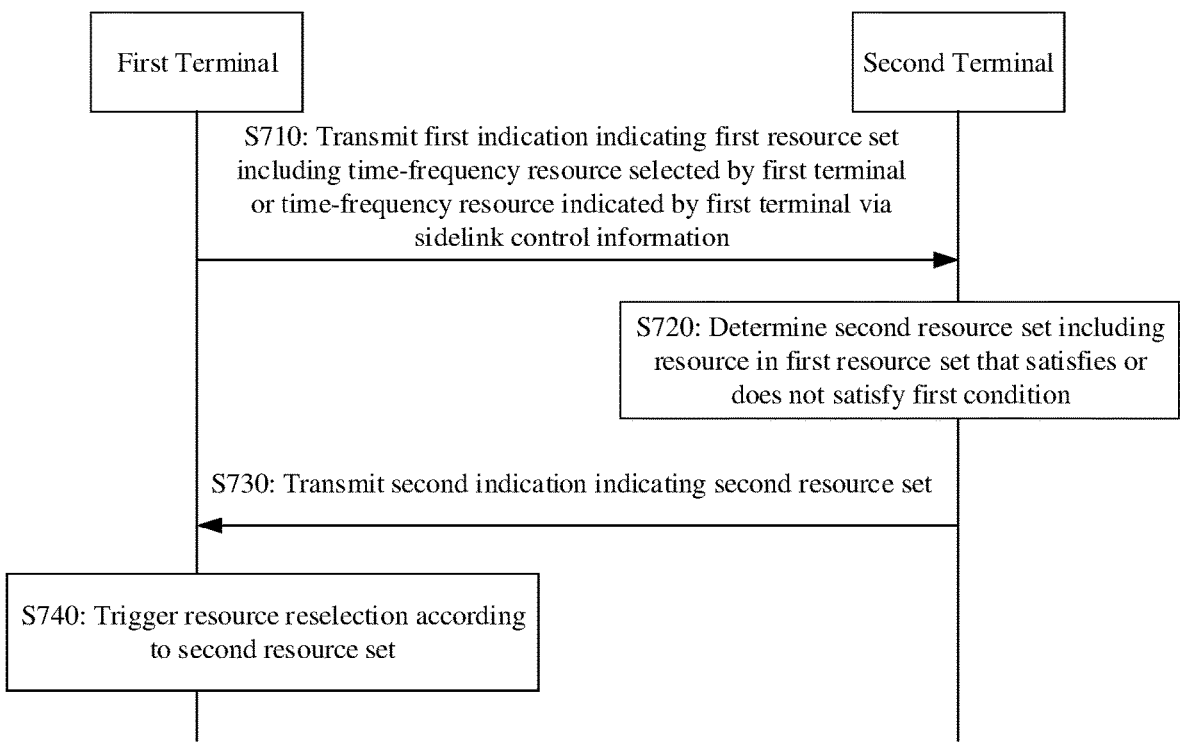
FIG. 7 is an interaction flowchart illustrating a wireless communication method according to an embodiment of the present disclosure.

FIG. 7 is an interactive flowchart illustrating a wireless communication method according to an embodiment of the present disclosure. As shown in FIG. 7, the method includes the following steps.

At Step S710, a first terminal transmits a first indication to a second terminal. The first indication indicates a first resource set including a time-frequency resource selected by the first terminal or a time-frequency resource indicated by the first terminal via sidelink control information.

At Step S720, the second terminal determines a second resource set including a resource in the first resource set that satisfies or does not satisfy a first condition.

At Step S730, the second terminal transmits a second indication to the first terminal. The second indication indicates the second resource set.

At Step S740, the first terminal triggers resource reselection according to the second resource set.

Optionally, the first indication may include a first frequency domain indication and a first time domain indication. The first frequency domain indication indicates a frequency domain position of each resource in the first resource set, and the first time domain indication indicates a time domain position of each resource in the first resource set.

Optionally, the first frequency domain indication may be an absolute indication or a relative indication relative to a predetermined frequency domain position, and the first time domain indication may be an absolute indication or a relative indication relative to a predetermined time domain position.

Optionally, the predetermined time domain position and the predetermined frequency domain position may be configured by a network device for the first terminal, or may be predefined.

Optionally, the predetermined time domain position may be a time domain position occupied by the first terminal when transmitting the first indication, and the predetermined frequency domain position may be a frequency domain position occupied by the first terminal when transmitting the first indication. Alternatively, the predetermined time domain position may be a time domain start position when the first terminal transmits the first indication, and the predetermined frequency domain position may be a frequency domain start position when the first terminal transmits the first indication. In a word, the present disclosure is not limited to any predetermined time domain position.

It should be understood that, for a resource, the frequency domain position and the time domain position of the resource indicated by the first frequency domain indication and the first time domain indication respectively may both be relative values or absolute values, or one may be a relative value and the other may be an absolute value. The present disclosure is not limited to any of these examples.

Optionally, the first indication may be transmitted at any of:

(1) first one at time after the first terminal completes resource selection;

(2) any time between time at which the first terminal completes the resource selection and time of an initial transmission by the first terminal;

(3) a sum of the time at which the first terminal completes the resource selection and a predetermined time offset;

(4) time at which the first terminal transmits a PSSCH; or (5) any time between the time at which the first terminal completes the resource selection and first time, the first time being a difference between the time of the initial transmission by the first terminal and a first time period.

Optionally, the "time" as used in the present disclosure may also referred to as a time unit, which may be e.g., a time slot, a millisecond, etc., and the present disclosure is not limited to any of these examples. For example, the above first one at time may be the first time slot after the first terminal completes the resource selection.

Optionally, the predetermined time offset may be pre-configured, semi-statically or dynamically configured by a network device for the terminal device, or determined by the first terminal, and the present disclosure is not limited to any of these examples.

Optionally, the first time period may include time when the first terminal performs resource selection or reselection. For example, the first terminal performs resource reselection in time slot 3, and the first time period is the time period composed of time slots 1-3, i.e., the first time period includes time slot 3. In another example, the first terminal triggers resource reselection in time slot 1 and completes resource reselection in time slot 3, that is, the time for the terminal to perform the resource reselection is 1-3, and the first time period includes time slots 1-3.

Optionally, the unit of the first time period may also be a time slot or a millisecond, and the present disclosure is not limited to any of these examples.

Optionally, when calculating the first time, the time unit of the time of the initial transmission by the first terminal and the time unit of the first time period are unified first, for example, they may be unified into time slots or milliseconds.

It should be understood that, in the present disclosure, the time between any two time instances may include at least one of these two time instances, or may include neither of these two time instances, and the present disclosure is not limited to any of these examples.

Optionally, the first indication may be carried in any of: sidelink control information in a PSCCH transmitted by the first terminal, sidelink control information in a PSSCH transmitted by the first terminal, PC5-Radio Resource Control (RRC) signaling, or a Medium Access Control Control Element (MAC CE).

It should be noted that the "sidelink control information" in the time-frequency resource indicated by the first terminal via the sidelink control information refers to the sidelink control information in the PSCCH transmitted by the first terminal.

Optionally, the first condition may include at least one of:
(1) resources in the first resource set resulting in overlapping resources between transmission resources of the first terminal and transmission resources of the second terminal; or
(2) the resources in the first resource set resulting in overlapping resources between the transmission resources of the first terminal and a third resource set.

Optionally, the third resource set may be a resource set determined according to a resource and a resource reservation period indicated in sidelink control information detected by the second terminal. For example, a sum of the time domain position of the resource and the resource reservation period indicated by the sidelink control information may be used to obtain the time domain positions of the resources in the third resource set. Based on this, the third resource set may include: resources determined according to the resource and the resource reservation period indicated by the sidelink control information as detected by the second terminal resources, and the resource indicated by the sidelink control information.

Optionally, the third resource set may be a resource set determined according to the resource indicated in the sidelink control information detected by the second terminal. That is, in this case, the third resource set includes the resource indicated in the sidelink control information.

Optionally, the transmission resources of the first terminal may be the resources in the first resource set. Alternatively, the transmission resources of the first terminal may be determined according to at least one of the resources in the first resource set, the resource reservation period of the first terminal, or a first random value. The first random value is used for determining a number of periods reserved by the first terminal for the time-frequency resource selected by the first terminal or the time-frequency resource indicated by the first terminal via the sidelink control information.

Optionally, the transmission resources of the second terminal may be resources in the fourth resource set. Alternatively, the transmission resources of the second terminal may be determined according to at least one of the resources in the fourth resource set, the resource reservation period of the second terminal, or a second random value. The second random value is used for determining a number of periods reserved by the second terminal for a time-frequency resource selected by the second terminal or a time-frequency resource indicated by the second terminal via sidelink control information. The fourth resource set includes the time-frequency resource selected by the second terminal or the time-frequency resource indicated by the second terminal via the sidelink control information.

Optionally, when the above resource reservation period of the first terminal does not exist, the resources in the first resource set result in overlapping resources between the transmission resources of the first terminal and the transmission resources of the second terminal, indicating that the resources in the first resource set overlap with the transmission resources of the second terminal. When the above resource reservation period of the first terminal exists, for the resources in the first resource set, the corresponding reserved resources can be determined. Therefore, the resources in the first resource set result in overlapping resources between the transmission resources of the first terminal and the transmission resources of the second terminal, indicating that the resources in the first resource set overlap with the transmission resources of the second terminal, and/or the reserved resources corresponding to the resources in the first resource set overlap with the transmission resources of the second terminal.

Optionally, when the resource reservation period of the first terminal does not exist, the resources in the first resource set result in overlapping resources between the transmission resources of the first terminal and the third resource set, indicating that the resources in the first resource set overlap with the third resource set. When the above resource reservation period of the first terminal exists, for the resources in the first resource set, the corresponding reserved resources can be determined. Therefore, the resources in the first resource set result in overlapping resources between the transmission resources of the first terminal and the third resource set, indicating that the resources in the first resource set overlap with the third resource set, and/or the reserved resources corresponding to the resources in the first resource set overlap with the third resource set.

It should be understood that the resource reservation period of the first terminal is also described as the resource reservation period used by the first terminal, which is the resource reservation period in the sidelink control information in the PSCCH transmitted by the first terminal, that is, the value indicated in the "Resource Reservation Period" field.

It should be understood that the resource reservation period of the second terminal is also described as the resource reservation period used by the second terminal, which is the resource reservation period in the sidelink control information in the PSCCH transmitted by the second terminal, that is, the value indicated in the "Resource Reservation Period" field.

Optionally, in the present disclosure, the overlapping resources may be resources that overlap in both the time domain and the frequency domain, or resources that overlap in the time domain.

Optionally, the above first condition in (1) is mainly for the scenario where the second terminal is the receiver for the first terminal. If a certain resource in the first resource set satisfies the above first condition in (1), there may be a half-duplex problem, that is, both the first terminal and the second terminal transmit data on the overlapping resources in (1). When the second terminal is transmitting data, it cannot receive the data transmitted by the first terminal, so it cannot decode the data transmitted by the first terminal.

Optionally, if a certain resource in the first resource set satisfies the above first condition in (2), the transmission resources of the first terminal may be interfered or may conflict with the transmission resources of another terminal. That is, the second terminal detects that another terminal needs to transmit data on the overlapping resource in (2), while the first terminal also needs to transmit data on the resource.

Optionally, the first condition may further include at least one of:
(3) a resource reservation period of the first terminal being same as a resource reservation period of the second terminal, or one of the resource reservation period of the first terminal and the resource reservation period of the second terminal being a multiple of the other;
(4) a priority of data to be transmitted by the second terminal being higher than a priority of data to be transmitted by the first terminal;
(5) SL-RSRP of a PSCCH where the sidelink control information detected by the second terminal is located being greater than or equal to an RSRP threshold;

(6) SL-RSRP of a PSSCH scheduled by the PSCCH being greater than or equal to a RSRP threshold;
(7) the resource reservation period in the sidelink control information detected by the second terminal being same as the resource reservation period of the first terminal, or one of the resource reservation period in the sidelink control information detected by the second terminal and the resource reservation period of the first terminal is a multiple of the other; or
(8) a priority in the sidelink control information detected by the second terminal being higher than a priority of the data to be transmitted by the first terminal.

It should be understood that the RSRP thresholds in (5) and (6) may be the same or different, and the present disclosure is not limited to this.

Optionally, the second resource set may be used to trigger the first terminal to perform the resource reselection.

Optionally, the second indication may include a second frequency domain indication and a second time domain indication. The second frequency domain indication may indicate a frequency domain position of each resource in the second resource set, and the second time domain indication may indicate a time domain position of each resource in the second resource set.

Optionally, the second frequency domain indication may be an absolute indication or a relative indication relative to a predetermined frequency domain position, and the second time domain indication may be an absolute indication or a relative indication relative to a predetermined time domain position.

Optionally, the predetermined time domain position and the predetermined frequency domain position may be configured by a network device for the second terminal, or may be predefined.

Optionally, the predetermined time domain position may be a time domain position occupied by the second terminal when transmitting the second indication, and the predetermined frequency domain position may be a frequency domain position occupied by the second terminal when transmitting the second indication. Alternatively, the predetermined time domain position may be a time domain start position when the second terminal transmits the second indication, and the predetermined frequency domain position may be a frequency domain start position when the second terminal transmits the second indication. In a word, the present disclosure is not limited to the predetermined time domain position.

It should be understood that, for a resource, the frequency domain position and the time domain position of the resource indicated by the second frequency domain indication and the second time domain indication respectively may both be relative values or absolute values, or one may be a relative value and the other may be an absolute value, and the present disclosure is not limited to any of these examples.

Optionally, the second indication may include an index of each resource in the second resource set in the first resource set. For example, the first resource set may include Resource 1, Resource 2 and Resource 3, where 1-3 represent the indexes of the resources, respectively, and the second indication may include 1 and 3, indicating that the resources in the second resource set are Resource 1 and Resource 3.

Optionally, the second indication may be transmitted at any of:
(1) any time before second time, the second time being time corresponding to a resource having a lowest time domain position in the first resource set;
(2) any time before third time, the third time being a difference between the second time and a first time period;
(3) any time before fourth time, the fourth time being time corresponding to a resource in the first resource set that satisfies the first condition and has a lowest time domain position;
(4) any time before fifth time, the fifth time being a difference between the fourth time and the first time period;
(5) any time earlier than or equal to sixth time, the sixth time being time indicated by the first terminal for determining time at which the second indication is transmitted; or
(6) any time earlier than or equal to seventh time, the seventh time being a difference between the sixth time and the first time period.

Optionally, the first terminal may indicate that the time at which the second indication is transmitted as the sixth time, or may indicate that the second indication is transmitted before the sixth time.

It should be noted that the time at which the second indication is transmitted can also be described as follows, as non-limiting examples. The time at which the second indication is transmitted may be any of:
(1) earlier than second time, the second time being time corresponding to a resource having a lowest time domain position in the first resource set;
(2) earlier than third time, the third time being a difference between the second time and the first time period;
(3) earlier than fourth time, the fourth time being time corresponding to a resource in the first resource set that satisfies the first condition and has a lowest time domain position;
(4) earlier than fifth time, the fifth time being a difference between the fourth time and the first time period;
(5) earlier than or equal to sixth time, the sixth time being time indicated by the first terminal for determining time at which the second indication is transmitted; or
(6) earlier than or equal to seventh time, the seventh time being a difference between the sixth time and the first time period.

Optionally, the sixth time may be an absolute time. Alternatively, the sixth time may be a time offset relative to time at which the first information is transmitted or received.

It should be noted that, for the explanation of the time at which the second indication is transmitted, reference may be made to the explanation of the time at which the first indication is transmitted, and details thereof will be omitted here.

Optionally, the second indication may be carried in any of: sidelink control information in a PSCCH transmitted by the second terminal, sidelink control information in a PSSCH transmitted by the second terminal, PC5-RRC signaling, or MAC CE.

Optionally, the first terminal may further transmit first information to the second terminal, the first information including at least one of: a resource reservation period of the first terminal, a first random value, a priority of data to be transmitted by the first terminal, or sixth time.

It should be understood that, for the explanation of each item in the first information, reference may be made to the above description, and details thereof will be omitted here.

Optionally, the time at which the first information is transmitted and the time at which the first indication is received may be same or different, and the present disclosure is not limited to this.

Optionally, a scheme for carrying the first information and a scheme for carrying the first indication may be same or different, and the present disclosure is not limited to this. For example, both the first indication and the first information may be carried in the sidelink control information in the PSCCH transmitted by the first terminal, or the first indication may be carried in the sidelink control information in the PSCCH transmitted by the first terminal and the first information may be carried in PC5-RRC signaling.

Optionally, if the second resource set includes the resource in the first resource set that satisfies the first condition, then the first terminal may trigger resource reselection for the resource. Alternatively, when the resource reselection is triggered in a process of re-evaluating the selected resource or determining whether the selected resource is preempted by another terminal, the resource can also be reselected.

Optionally, if the second resource set include the resource in the first resource set that does not satisfy the first condition, then the first terminal first determines the resource in the first resource set that satisfies the first condition according to the second resource set, and then the first terminal may trigger resource reselection for the resource that satisfies the first condition. Alternatively, when the resource reselection is triggered in a process of re-evaluating the selected resource or determining whether the selected resource is preempted by another terminal, the resource that satisfies the first condition can also be reselected.

Optionally, the resource reselection may be performed by the first terminal at any of:
(1) first one at time after time at which the second indication is received;
(2) any time between the time at which the second indication is received and fourth time, the fourth time being time corresponding to a resource in the first resource set that satisfies the first condition and has a lowest time domain position;
(3) any time between the time at which the second indication is received and fifth time, the fifth time being a difference between the fourth time and first time period;
(4) the fifth time;
(5) any time between the time at which the second indication is received and time of an initial transmission by the first terminal;
(6) any time between the time at which the second indication is received and first time, the first time being a difference between the time of the initial transmission by the first terminal and the first time period; or
(7) the first time.

It should be noted that, for the explanation of the time at which the first terminal performs the resource reselection, reference may be made to the explanation of the time at which the first indication is transmitted, and details thereof will be omitted here.

The present disclosure has provided above the time at which the first indication is transmitted, the time at which the second indication is transmitted, and the time at which the first terminal performs the resource reselection. They will be described below with reference to two examples.

Figure 8:
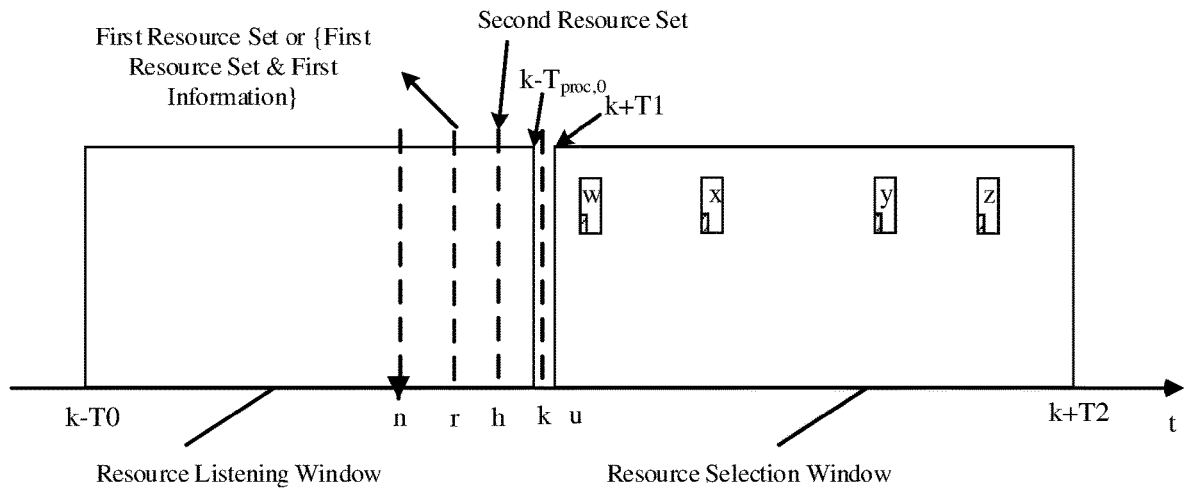
FIG. 8 is a fifth schematic diagram showing a resource distribution according to the present disclosure.

Example 1: As shown in FIG. 8, the first terminal completes resource selection in time slot n, and selects Resources w, x, y, and z. Within the time period from completion of the resource selection to u-Ti, the first terminal determines to transmit the first resource set, or the first resource set and the first information, to the second terminal in time slot r, where u represents the time slot of the initial transmission by the first terminal, and Ti represents the first time period. The first resource set here includes Resources w, x, y, and z. The second terminal determines whether the resources in the first resource set satisfy the first condition, determines the second resource set, and feeds back the second resource set to the first terminal in time slot h. The second resource set includes Resources w, y, z. Within the time period from reception of the second resource set in time slot h to u-Ti, the first terminal determines to trigger resource reselection for Resources w, y, and z in the second resource set in time slot k. Here, the first terminal first determines the resource listening window k-T0 to k-$T_{proc, 0}$ and the resource selection window k+T1 to k+T2, performs the above Step 1 to determine the candidate resource set, and further performs the above Step 2 to select a resource from the candidate resource set.

It should be noted that, when the resource reselection is performed according to the resources in the second resource set, it is necessary to avoid that a reselected resource and a resource in the first resource set that does not satisfy the first condition are in the same time slot. For example, in the reselection process for w, y, and z, the first terminal should avoid that the reselected resource and Resource x are in the same time slot. Otherwise, there would be more than one transmission in one time slot, but the first terminal is not capable of multiple transmissions in the same time slot, and then there would be a problem of inconsistency with the capability of the first terminal.

Figure 9:
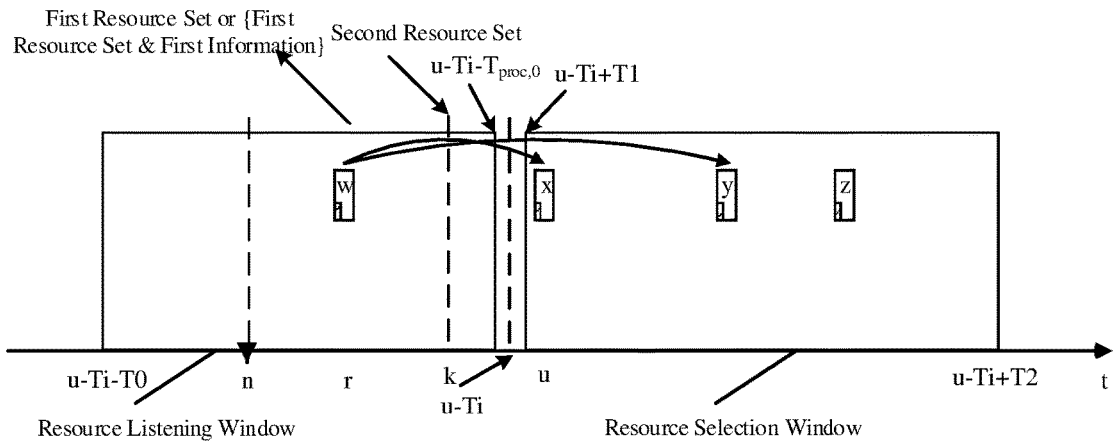
FIG. 9 is a sixth schematic diagram showing a resource distribution according to the present disclosure.

Example 2: As shown in FIG. 9, the first terminal completes resource selection in time slot n, and selects Resources w, x, y, and z. The first terminal transmits the first resource set, or the first resource set and the first information, to the second terminal via the sidelink control information in the PSCCH in time slot r where the PSSCH for Resource w is transmitted. The first resource set includes Resources w, x, y indicated by the first sidelink control information, or the first resource set includes Resources x, y reserved by the first sidelink control information. The first information includes the priority of the data to be transmitted by the first terminal and/or the resource reservation period used by the first terminal. The second terminal determines whether the resources in the first resource set satisfy the first condition, determines the second resource set, and feeds back the second resource set to the first terminal in time slot k. The second resource set includes Resource x. In the time period from reception of the second resource set in time slot k to u-Ti, the first terminal determines to trigger resource reselection for Resource x in the second resource set in the time slot corresponding to time slot u-Ti, where u is the time slot of Resource x, u is the time domain position of the resource in the first resource set that has the lowest time domain position and satisfies the first condition, and Ti is the first time period. The first terminal determines the resource listening window u-Ti-T0 to u-Ti-$T_{proc, 0}$ and the resource selection window u-Ti+T1 to u-Ti+T2, performs the above Step 1 to determine the candidate resource set, and performs the above Step 2 to select a resource from the candidate resource set.

It should be noted that, when the resource reselection is performed according to the resources in the second resource set, it is necessary to avoid that a reselected resource and a resource in the first resource set that does not satisfy the first condition are in the same time slot.

To summarize, in the present disclosure, the first terminal may indicate the first resource set to the second terminal. The second terminal may determine the second resource set, and indicate the second resource set to the first terminal, such that the first terminal can identify overlapping resources having a half-duplex problem or interference, thereby triggering resource reselection for such resources, so as to improve the reliability of the communication system.

It should be understood that, in the above embodiment, regardless of whether the second resource set includes a resource in the first resource set that satisfies or does not satisfy the first condition, the second terminal indicates the second resource set to the first terminal. However, in some cases, the second terminal may not indicate the second resource set, as follows.

Figure 10:
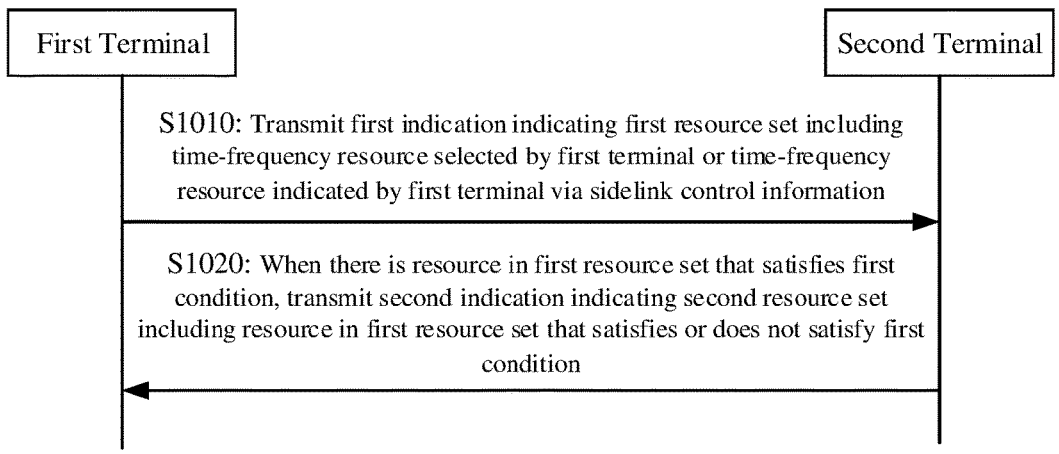
FIG. 10 is an interaction flowchart illustrating a wireless communication method according to another embodiment of the present disclosure.

Exemplarily, FIG. 10 is an interaction flowchart illustrating a wireless communication method according to another embodiment of the present disclosure. As shown in FIG. 10, the method includes the following steps.

At Step S1010, a first terminal transmits a first indication to a second terminal, the first indication indicating a first resource set including a time-frequency resource selected by the first terminal or a time-frequency resource indicated by the first terminal via sidelink control information.

At Step S1020, when there is a resource in the first resource set that satisfies the first condition, the second terminal transmits a second indication to the first terminal. The second indication indicates a second resource set including a resource in the first resource set that satisfies or does not satisfy the first condition.

Figure 11:
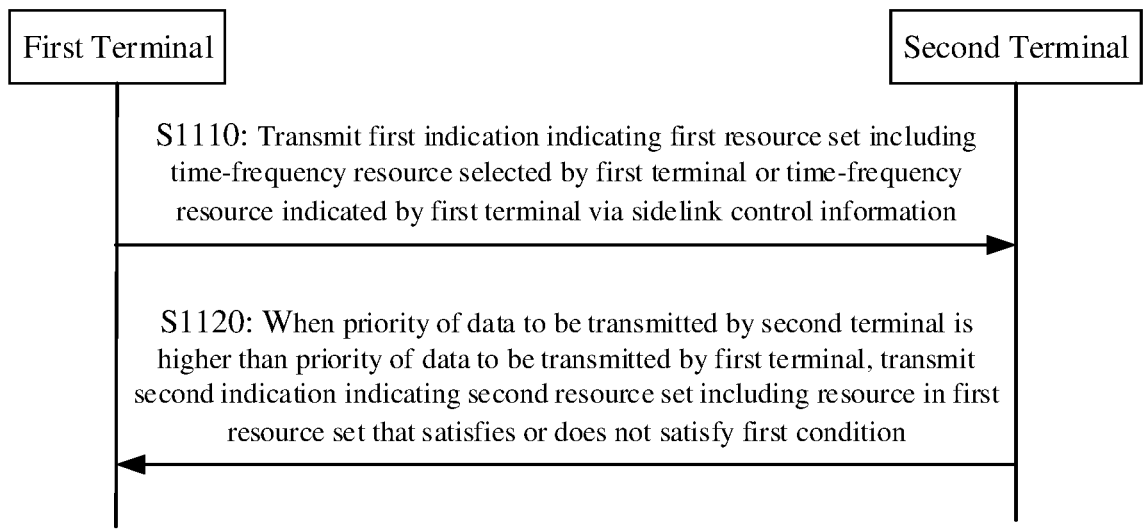
FIG. 11 is an interaction flowchart illustrating a wireless communication method according to yet another embodiment of the present disclosure.

Exemplarily, FIG. 11 is an interaction flowchart illustrating a wireless communication method according to yet another embodiment of the present disclosure. As shown in FIG. 11, the method includes the following steps.

At Step S1110, a first terminal transmits a first indication to a second terminal, the first indication indicating a first resource set including a time-frequency resource selected by the first terminal or a time-frequency resource indicated by the first terminal via sidelink control information.

At Step S1120, when a priority of data to be transmitted by the second terminal is higher than a priority of data to be transmitted by the first terminal, the second terminal transmits a second indication to the first terminal, the second indication indicating a second resource set including a resource in the first resource set that satisfies or does not satisfy the first condition.

It should be understood that an alternative to Step S1120 may be that, when the priority of the data to be transmitted by the second terminal is higher than or equal to the priority of the data to be transmitted by the first terminal, the second terminal transmits the second indication to the first terminal.

It should be understood that, for the explanation of each concept in the above two examples, reference may be made to the previous embodiment, and details thereof will be omitted here.

To summarize, in the present disclosure, if none of the resources in the first resource set satisfies the first condition, or the priority of the data to be transmitted by the second terminal is lower than or equal to the priority of the data to be transmitted by the first terminal, the second terminal does not indicate the second resource set, that is, the resources in the first resource set do not have the half-duplex or interference problem, and thus the first terminal does not need to perform resource reselection. In this way, while ensuring the reliability of the communication system, it can also reduce the signaling overhead between the first terminal and the second terminal.

The method embodiments of the present disclosure have been described in detail above with reference to FIGS. 7 to 11, and the apparatus embodiments of the present disclosure will be described in detail below with reference to FIGS. 12 to 19. It should be understood that the apparatus embodiments and the method embodiments correspond to each other, and for similar description, reference can be made to the method embodiments.

Figure 12:
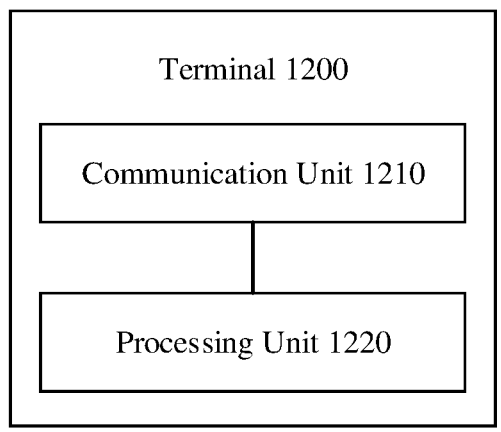
FIG. 12 shows a schematic block diagram of a terminal 1200 according to an embodiment of the present disclosure.

FIG. 12 shows a schematic block diagram of a terminal 1200 according to an embodiment of the present disclosure. As shown in FIG. 12, the terminal is a first terminal, including: a communication unit 1210 and a processing unit 1220. The communication unit 1210 is configured to: transmit a first indication to a second terminal, the first indication indicating a first resource set including a time-frequency resource selected by the first terminal or a time-frequency resource indicated by the first terminal via sidelink control information; and receive a second indication indicating a second resource set including a resource in the first resource set that satisfies or does not satisfy a first condition. The processing unit 1220 is configured to trigger resource reselection according to the second resource set.

Optionally, the first condition may include at least one of: resources in the first resource set resulting in overlapping resources between transmission resources of the first terminal and transmission resources of the second terminal; or the resources in the first resource set resulting in overlapping resources between the transmission resources of the first terminal and a third resource set.

The third resource set is a resource set determined according to a resource and a resource reservation period indicated in sidelink control information detected by the second terminal, or a resource set determined according to the resource indicated in the sidelink control information detected by the second terminal.

Optionally, the first condition may further include at least one of: a resource reservation period of the first terminal being same as a resource reservation period of the second terminal, or one of the resource reservation period of the first terminal and the resource reservation period of the second terminal being a multiple of the other; a priority of data to be transmitted by the second terminal being higher than a priority of data to be transmitted by the first terminal; SL-RSRP of a PSCCH where the sidelink control information detected by the second terminal is located being greater than or equal to an RSRP threshold; SL-RSRP of a PSSCH scheduled by the PSCCH being greater than or equal to a RSRP threshold; the resource reservation period in the sidelink control information detected by the second terminal being same as the resource reservation period of the first terminal, or one of the resource reservation period in the sidelink control information detected by the second terminal and the resource reservation period of the first terminal is a multiple of the other; or a priority in the sidelink control information detected by the second terminal being higher than a priority of the data to be transmitted by the first terminal.

Optionally, the transmission resources of the first terminal may be the resources in the first resource set; or the transmission resources of the first terminal may be determined according to at least one of the resources in the first resource set, the resource reservation period of the first terminal, or a first random value, the first random value being used for determining a number of periods reserved by the first terminal for the time-frequency resource selected by the first terminal or the time-frequency resource indicated by the first terminal via the sidelink control information.

Optionally, the transmission resources of the second terminal may be resources in the fourth resource set; or the transmission resources of the second terminal may be determined according to at least one of the resources in the fourth resource set, the resource reservation period of the second terminal, or a second random value, the second random value being used for determining a number of periods reserved by the second terminal for a time-frequency resource selected by the second terminal or a time-frequency resource indicated by the second terminal via sidelink control information.

The fourth resource set includes the time-frequency resource selected by the second terminal or the time-frequency resource indicated by the second terminal via the sidelink control information.

Optionally, the first indication may be carried in any of: sidelink control information in a PSCCH transmitted by the first terminal, sidelink control information in a PSSCH transmitted by the first terminal, PC5-RRC signaling, or a MAC CE.

Optionally, the first indication may include a first frequency domain indication and a first time domain indication. The first frequency domain indication may indicate a frequency domain position of each resource in the first resource set, and the first time domain indication may indicate a time domain position of each resource in the first resource set.

Optionally, the first frequency domain indication may be an absolute indication or a relative indication relative to a predetermined frequency domain position, and the first time domain indication may be an absolute indication or a relative indication relative to a predetermined time domain position.

Optionally, the first indication may be transmitted at any of: first one at time after the first terminal completes resource selection; any time between time at which the first terminal completes the resource selection and time of an initial transmission by the first terminal; a sum of the time at which the first terminal completes the resource selection and a predetermined time offset; time at which the first terminal transmits a PSSCH; or any time between the time at which the first terminal completes the resource selection and first time, the first time being a difference between the time of the initial transmission by the first terminal and a first time period.

Optionally, the second indication may be carried in any of: sidelink control information in a PSCCH transmitted by the second terminal, sidelink control information in a PSSCH transmitted by the second terminal, PC5-RRC signaling, or MAC CE.

Optionally, the second indication may include a second frequency domain indication and a second time domain indication. The second frequency domain indication may indicate a frequency domain position of each resource in the second resource set, and the second time domain indication may indicate a time domain position of each resource in the second resource set.

Optionally, the second frequency domain indication may be an absolute indication or a relative indication relative to a predetermined frequency domain position, and the second time domain indication may be an absolute indication or a relative indication relative to a predetermined time domain position.

Optionally, the second indication may include an index of each resource in the second resource set in the first resource set.

Optionally, the second indication may be transmitted at any of: any time before second time, the second time being time corresponding to a resource having a lowest time domain position in the first resource set; any time before third time, the third time being a difference between the second time and a first time period; any time before fourth time, the fourth time being time corresponding to a resource in the first resource set that satisfies the first condition and has a lowest time domain position; any time before fifth time, the fifth time being a difference between the fourth time and the first time period; any time earlier than or equal to sixth time, the sixth time being time indicated by the first terminal for determining time at which the second indication is transmitted; or any time earlier than or equal to seventh time, the seventh time being a difference between the sixth time and the first time period.

Optionally, the communication unit 1210 may be further configured to transmit first information to the second terminal, the first information including at least one of: a resource reservation period of the first terminal, a first random value, a priority of data to be transmitted by the first terminal, or sixth time. The first random value is used for determining a number of periods reserved by the first terminal for the time-frequency resource selected by the first terminal or the time-frequency resource indicated by the first terminal via the sidelink control information, and the sixth time is time indicated by the first terminal for determining time at which the second indication is transmitted.

Optionally, the sixth time may be an absolute time. Alternatively, the sixth time may be a time offset relative to time at which the first information is transmitted or received.

Optionally, the time at which the first information is transmitted and the time at which the first indication is received may be same or different.

Optionally, a scheme for carrying the first information and a scheme for carrying the first indication may be same or different.

Optionally, the processing unit 1220 may be configured to: determine a resource that satisfies the first condition according to the second resource set; and trigger the resource reselection according to the resource that satisfies the first condition.

Optionally, the processing unit 1220 may be configured to: trigger the resource reselection for a resource that satisfies the first condition; or trigger the resource reselection for the resource that satisfies the first condition in a process of re-evaluating the resource selected by the first terminal or determining whether the resource selected by the first terminal is preempted by another terminal.

Optionally, the resource reselection may be performed by the first terminal at any of: first one at time after time at which the second indication is received; any time between the time at which the second indication is received and fourth time, the fourth time being time corresponding to a resource in the first resource set that satisfies the first condition and has a lowest time domain position; any time between the time at which the second indication is received and fifth time, the fifth time being a difference between the fourth time and first time period; the fifth time; any time between the time at which the second indication is received and time of an initial transmission by the first terminal; any time between the time at which the second indication is received and first time, the first time being a difference between the time of the initial transmission by the first terminal and the first time period; or the first time.

Optionally, in some embodiments, the above communication unit may be a communication interface or a transceiver, or an input/output interface of a communication chip or a system-on-chip. The above processing unit may be one or more processors.

It should be understood that the terminal 1200 according to the embodiment of the present disclosure may correspond to the first terminal in the method embodiment of the present disclosure as shown in FIG. 7, and the above and other operations and/or functions of the respective units in the terminal 1200 are provided for the purpose of implementing the process flow corresponding to the first terminal in the method embodiment of the present disclosure as shown in FIG. 7, and details thereof will be omitted here for brevity.

Figure 13:
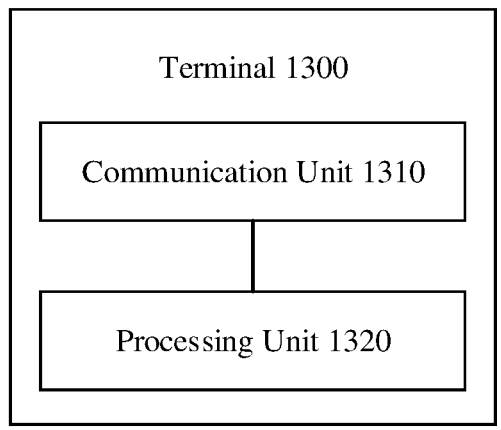
FIG. 13 shows a schematic block diagram of a terminal 1300 according to an embodiment of the present disclosure.

FIG. 13 shows a schematic block diagram of a terminal 1300 according to an embodiment of the present disclosure. As shown in FIG. 13, the terminal is a second terminal, including: a communication unit 1310 and a processing unit 1320. The communication unit 1310 is configured to receive a first indication transmitted by the first terminal, the first indication indicating a first resource set including a time-frequency resource selected by the first terminal or a time-frequency resource indicated by the first terminal via sidelink control information. The processing unit 1320 is configured to determine a second resource set including a resource in the first resource set that satisfies or does not satisfy a first condition. The communication unit 1310 is further configured to transmit a second indication to the first terminal, the second indication indicating the second resource set.

Optionally, the first condition may include at least one of: resources in the first resource set resulting in overlapping resources between transmission resources of the first terminal and the transmission resources of the second terminal; or the resources in the first resource set resulting in overlapping resources between the transmission resources of the first terminal and a third resource set.

The third resource set is a resource set determined according to a resource and a resource reservation period indicated in sidelink control information detected by the second terminal, or a resource set determined according to the resource indicated in the sidelink control information detected by the second terminal.

Optionally, the first condition may further include at least one of: a resource reservation period of the first terminal being same as a resource reservation period of the second terminal, or one of the resource reservation period of the first terminal and the resource reservation period of the second terminal being a multiple of the other; a priority of data to be transmitted by the second terminal being higher than a priority of data to be transmitted by the first terminal; SL-RSRP of a PSCCH where the sidelink control information detected by the second terminal is located being greater than or equal to an RSRP threshold; SL-RSRP of a PSSCH scheduled by the PSCCH being greater than or equal to a RSRP threshold; the resource reservation period in the sidelink control information detected by the second terminal being same as the resource reservation period of the first terminal, or one of the resource reservation period in the sidelink control information detected by the second terminal and the resource reservation period of the first terminal is a multiple of the other; or a priority in the sidelink control information detected by the second terminal being higher than a priority of the data to be transmitted by the first terminal.

Optionally, the transmission resources of the first terminal may be the resources in the first resource set; or the transmission resources of the first terminal may be determined according to at least one of the resources in the first resource set, the resource reservation period of the first terminal, or a first random value, the first random value being used for determining a number of periods reserved by the first terminal for the time-frequency resource selected by the first terminal or the time-frequency resource indicated by the first terminal via the sidelink control information.

Optionally, the transmission resources of the second terminal may be resources in the fourth resource set; or the transmission resources of the second terminal may be determined according to at least one of the resources in the fourth resource set, the resource reservation period of the second terminal, or a second random value, the second random value being used for determining a number of periods reserved by the second terminal for a time-frequency resource selected by the second terminal or a time-frequency resource indicated by the second terminal via sidelink control information.

The fourth resource set includes the time-frequency resource selected by the second terminal or the time-frequency resource indicated by the second terminal via the sidelink control information.

Optionally, the first indication is carried in any of: sidelink control information in a PSCCH transmitted by the first terminal, sidelink control information in a PSSCH transmitted by the first terminal, PC5-RRC signaling, or MAC CE.

Optionally, the first indication may include a first frequency domain indication and a first time domain indication. The first frequency domain indication may indicate a frequency domain position of each resource in the first resource set, and the first time domain indication may indicate a time domain position of each resource in the first resource set.

Optionally, the first frequency domain indication may be an absolute indication or a relative indication relative to a predetermined frequency domain position, and the first time domain indication may be an absolute indication or a relative indication relative to a predetermined time domain position.

Optionally, the first indication may be transmitted at any of: first one at time after the first terminal completes resource selection; any time between time at which the first terminal completes the resource selection and time of an initial transmission by the first terminal; a sum of the time at which the first terminal completes the resource selection and a predetermined time offset; time at which the first terminal transmits a PSSCH; or any time between the time at which the first terminal completes the resource selection and first time, the first time being a difference between the time of the initial transmission by the first terminal and a first time period.

Optionally, the second indication may be carried in any of: sidelink control information in a PSCCH transmitted by the second terminal, sidelink control information in a PSSCH transmitted by the second terminal, PC5-RRC signaling, or MAC CE.

Optionally, the second indication may include a second frequency domain indication and a second time domain indication. The second frequency domain indication may indicate a frequency domain position of each resource in the second resource set, and the second time domain indication may indicate a time domain position of each resource in the second resource set.

Optionally, the second frequency domain indication may be an absolute indication or a relative indication relative to a predetermined frequency domain position, and the second time domain indication may be an absolute indication or a relative indication relative to a predetermined time domain position.

Optionally, the second indication includes an index of each resource in the second resource set in the first resource set.

Optionally, the second indication may be transmitted at any of: any time before second time, the second time being time corresponding to a resource having a lowest time domain position in the first resource set; any time before third time, the third time being a difference between the second time and a first time period; any time before fourth time, the fourth time being time corresponding to a resource in the first resource set that satisfies the first condition and has a lowest time domain position; any time before fifth time, the fifth time being a difference between the fourth time and the first time period; any time earlier than or equal to sixth time, the sixth time being time indicated by the first terminal for determining time at which the second indication is transmitted; or any time earlier than or equal to seventh time, the seventh time being a difference between the sixth time and the first time period.

Optionally, the communication unit 1310 may be further configured to receive first information, the first information including at least one of: a resource reservation period of the first terminal, a first random value, a priority of data to be transmitted by the first terminal, or sixth time. The first random value is used for determining a number of periods reserved by the first terminal for the time-frequency resource selected by the first terminal or the time-frequency resource indicated by the first terminal via the sidelink control information, and the sixth time is time indicated by the first terminal for determining time at which the second indication is transmitted.

Optionally, the sixth time is absolute time; or the sixth time is a time offset relative to time at which the first information is transmitted or received.

Optionally, the time at which the first information is transmitted and the time at which the first indication is transmitted may be same or different.

Optionally, a scheme for carrying the first information and a scheme for carrying the first indication may be the same or different.

Optionally, resource reselection may be performed by the first terminal at any of: first one at time after time at which the second indication is received; any time between the time at which the second indication is received and fourth time, the fourth time being time corresponding to a resource in the first resource set that satisfies the first condition and has a lowest time domain position; any time between the time at which the second indication is received and fifth time, the fifth time being a difference between the fourth time and first time period; the fifth time; any time between the time at which the second indication is received and time of an initial transmission by the first terminal; any time between the time at which the second indication is received and first time, the first time being a difference between the time of the initial transmission by the first terminal and the first time period; or the first time.

Optionally, in some embodiments, the above communication unit may be a communication interface or a transceiver, or an input/output interface of a communication chip or a system-on-chip. The above processing unit may be one or more processors.

It should be understood that the terminal 1300 according to the embodiment of the present disclosure may correspond to the second terminal in the method embodiment of the present disclosure as shown in FIG. 7, and the above and other operations and/or functions of the respective units in the terminal 1300 are provided for the purpose of implementing the process flow corresponding to the second terminal in the method embodiment of the present disclosure as shown in FIG. 7, and details thereof will be omitted here for brevity.

Figure 14:
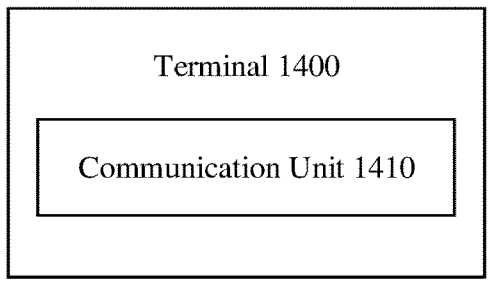
FIG. 14 shows a schematic block diagram of a terminal 1400 according to an embodiment of the present disclosure.

FIG. 14 shows a schematic block diagram of a terminal 1400 according to an embodiment of the present disclosure. As shown in FIG. 14, the terminal is a first terminal, and includes: a communication unit 1410 configured to transmit a first indication to a second terminal, the first indication indicating a first resource set including a time-frequency resource selected by the first terminal or a time-frequency resource indicated by the first terminal via sidelink control information.

Optionally, in some embodiments, the above communication unit may be a communication interface or a transceiver, or an input/output interface of a communication chip or a system-on-chip. The above processing unit may be one or more processors.

It should be understood that the terminal 1400 according to the embodiment of the present disclosure may correspond to the first terminal in the method embodiment of the present disclosure as shown in FIG. 10 or 11, and the above and other operations and/or functions of the respective units in the terminal 1400 are provided for the purpose of implementing the process flow corresponding to the first terminal in the method embodiment of the present disclosure as shown in FIG. 10 or 11, and details thereof will be omitted here for brevity.

Figure 15:
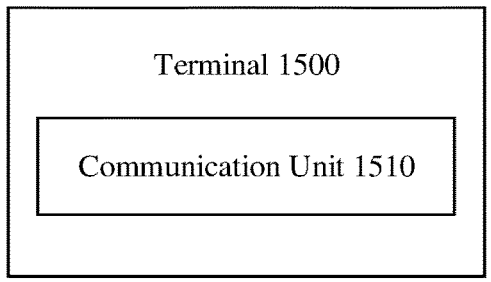
FIG. 15 shows a schematic block diagram of a terminal 1500 according to an embodiment of the present disclosure.

FIG. 15 shows a schematic block diagram of a terminal 1500 according to an embodiment of the present disclosure. As shown in FIG. 15, the terminal is a second terminal, including: a communication unit 1510 configured to receive a first indication transmitted by the first terminal, the first indication indicating a first resource set including a time-frequency resource selected by the first terminal or a time-frequency resource indicated by the first terminal via sidelink control information; and transmit, when there is a resource in the first resource set that satisfies the first condition, a second indication to the first terminal, the second indication indicating a second resource set including a resource in the first resource set that satisfies or does not satisfy the first condition.

Optionally, in some embodiments, the above communication unit may be a communication interface or a transceiver, or an input/output interface of a communication chip or a system-on-chip. The above processing unit may be one or more processors.

It should be understood that the terminal 1500 according to the embodiment of the present disclosure may correspond to the second terminal in the method embodiment of the present disclosure as shown in FIG. 10, and the above and other operations and/or functions of the respective units in the terminal 1500 are provided for the purpose of implementing the process flow corresponding to the second terminal in the method embodiment of the present disclosure as shown in FIG. 10, and details thereof will be omitted here for brevity.

Figure 16:
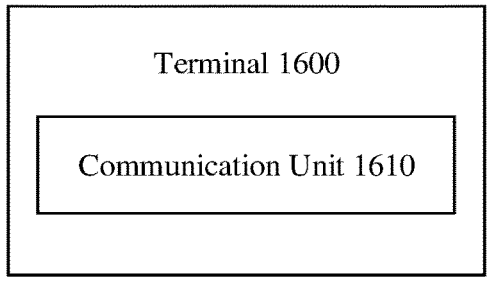
FIG. 16 shows a schematic block diagram of a terminal 1600 according to an embodiment of the present disclosure.

FIG. 16 shows a schematic block diagram of a terminal 1600 according to an embodiment of the present disclosure. As shown in FIG. 16, the terminal is a second terminal, and includes: a communication unit 1610 configured to receive a first indication transmitted by the first terminal, where the first indication indicating a first resource set including a time-frequency resource selected by the first terminal or a time-frequency resource indicated by the first terminal via sidelink control information; and transmit, when a priority of data to be transmitted by the second terminal is higher than a priority of data to be transmitted by the first terminal, a second indication to the first terminal, the second indication indicating a second resource set including a resource in the first resource set that satisfies or does not satisfy the first condition.

Optionally, in some embodiments, the above communication unit may be a communication interface or a transceiver, or an input/output interface of a communication chip or a system-on-chip. The above processing unit may be one or more processors.

It should be understood that the terminal 1600 according to the embodiment of the present disclosure may correspond to the second terminal in the method embodiment of the present disclosure as shown in FIG. 11, and the above and other operations and/or functions of the respective units in the terminal 1600 are provided for the purpose of implementing the process flow corresponding to the second terminal in the method embodiment of the present disclosure as shown in FIG. 11, and details thereof will be omitted here for brevity.

Figure 17:
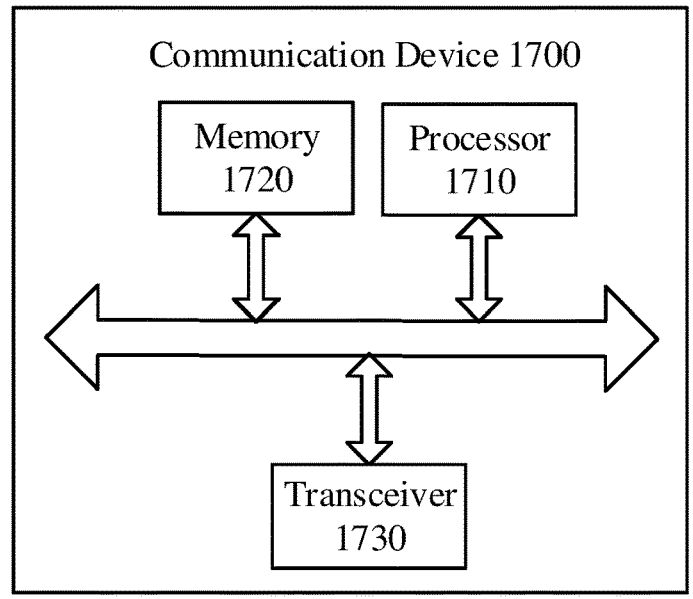
FIG. 17 is a schematic diagram showing a structure of a communication device 1700 according to an embodiment of the present disclosure.

FIG. 17 is a schematic diagram showing a structure of a communication device 1700 according to an embodiment of the present disclosure. The communication device 1700 shown in FIG. 17 includes a processor 1710, and the processor 1710 can invoke and execute a computer program from a memory to implement the method in the embodiment of the present disclosure.

Optionally, as shown in FIG. 17, the communication device 1700 may further include a memory 1720. The processor 1710 can invoke and execute a computer program from the memory 1720 to implement the method in the embodiment of the present disclosure.

The memory 1720 may be a separate device independent from the processor 1710, or may be integrated in the processor 1710.

Optionally, as shown in FIG. 17, the communication device 1700 may further include a transceiver 1730, and the processor 1710 may control the transceiver 1730 to communicate with other devices, and in particular, transmit information or data to other devices, or receive information or data transmitted by other devices.

Here, the transceiver 1730 may include a transmitter and a receiver. The transceiver 1730 may further include one or more antennas.

Optionally, the communication device 1700 may specifically be the first terminal according to the embodiment of the present disclosure, and the communication device 1700 may implement the corresponding processes implemented by the first terminal in any of the methods according to the embodiments of the present disclosure. For the sake of brevity, details thereof will be omitted here.

Optionally, the communication device 1700 may specifically be the second terminal according to the embodiment of the present disclosure, and the communication device 1700 may implement the corresponding processes implemented by the second terminal in any of the methods according to the embodiments of the present disclosure. For the sake of brevity, details thereof will be omitted here.

Figure 18:
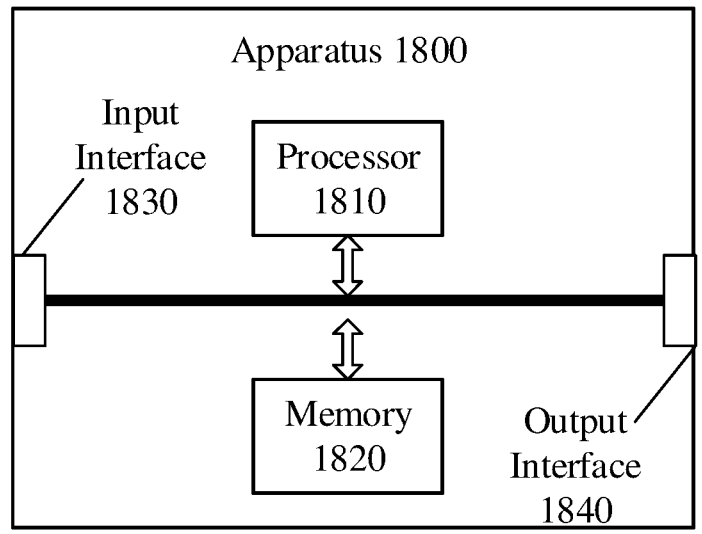
FIG. 18 is a schematic diagram showing a structure of an apparatus according to an embodiment of the present disclosure.

FIG. 18 is a schematic diagram showing a structure of an apparatus according to an embodiment of the present disclosure. The apparatus 1800 shown in FIG. 18 includes a processor 1810, and the processor 1810 can invoke and execute a computer program from a memory to implement the method in the embodiment of the present disclosure.

Optionally, as shown in FIG. 18, the apparatus 1800 may further include a memory 1820. The processor 1810 can invoke and execute a computer program from the memory 1820 to implement the method in the embodiment of the present disclosure.

The memory 1820 may be a separate device independent from the processor 1810, or may be integrated in the processor 1810.

Optionally, the apparatus 1800 may further include an input interface 1830. The processor 1810 can control the input interface 1830 to communicate with other devices or chips, and in particular, obtain information or data transmitted by other devices or chips.

Optionally, the apparatus 1800 may further include an output interface 1840. The processor 1810 can control the output interface 1840 to communicate with other devices or chips, and in particular, output information or data to other devices or chips.

Optionally, the apparatus can be applied to the first terminal in the embodiment of the present disclosure, and the apparatus can implement the corresponding processes implemented by the first terminal in the various methods of the embodiments of the present disclosure. For the sake of brevity, details thereof will be omitted here.

Optionally, the apparatus can be applied to the second terminal in the embodiment of the present disclosure, and the apparatus can implement the corresponding processes implemented by the second terminal in the various methods of the embodiments of the present disclosure. For the sake of brevity, details thereof will be omitted here.

Optionally, the apparatus in the embodiment of the present disclosure may be a chip, e.g., a system-level chip, a system-chip, a chip system, or a system-on-chip.

Figure 19:
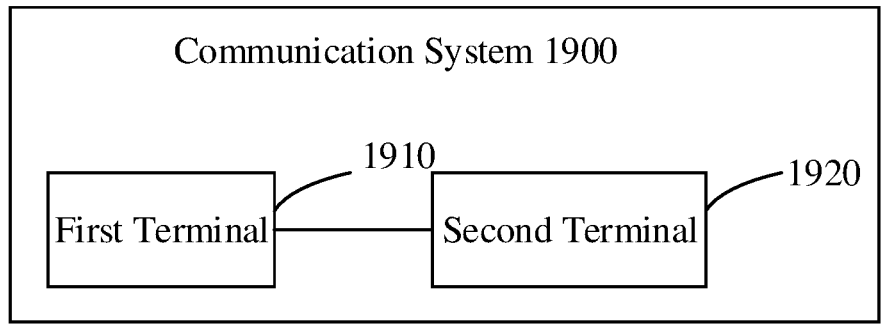
FIG. 19 is a schematic diagram showing a structure of a communication system 1900 according to an embodiment of the present disclosure.

FIG. 19 is a schematic block diagram of a communication system 1900 according to an embodiment of the present disclosure. As shown in FIG. 19, the communication system 1900 includes a first terminal 1910 and a second terminal 1920.

Here, the first terminal 1910 can be configured to perform the functions corresponding to the first terminal in any of the above methods, and the second terminal 1920 can be configured to perform the functions corresponding to the second terminal in any of the above methods. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device or base station in the embodiment of the present disclosure, and the computer program can cause a computer to perform corresponding procedures implemented by the network device or base station in the method according to any of the embodiments of the present disclosure. Details thereof will be omitted here for simplicity.

Optionally, the computer readable storage medium can be applied to the mobile terminal/terminal in the embodiment of the present disclosure, and the computer program can cause a computer to perform corresponding procedures implemented by the mobile terminal/terminal in the method according to any of the embodiments of the present disclosure. Details thereof will be omitted here for simplicity.

An embodiment of the present disclosure also provides a computer program product including computer program instructions.

Optionally, the computer program product can be applied to the network device or base station in the embodiment of the present disclosure, and the computer program instructions can cause a computer to perform corresponding procedures implemented by the network device or base station in the method according to any of the embodiments of the present disclosure. Details thereof will be omitted here for simplicity.

Optionally, the computer program product can be applied to the mobile terminal/terminal in the embodiment of the present disclosure, and the computer program instructions can cause a computer to perform corresponding procedures implemented by the mobile terminal/terminal in the method according to any of the embodiments of the present disclosure. Details thereof will be omitted here for simplicity.

An embodiment of the present disclosure also provides a computer program.

Optionally, the computer program can be applied to the network device or base station in the embodiment of the present disclosure. The computer program, when executed on a computer, can cause the computer to perform corresponding procedures implemented by the network device or base station in the method according to any of the embodiments of the present disclosure. Details thereof will be omitted here for simplicity.

Optionally, the computer program can be applied to the mobile terminal/terminal in the embodiment of the present disclosure. The computer program, when executed on a computer, can cause the computer to perform corresponding procedures implemented by the mobile terminal/terminal in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:
    transmitting, by a first terminal, a first indication to a second terminal, the first indication indicating a first resource set comprising a time-frequency resource selected by the first terminal or a time-frequency resource indicated by the first terminal via sidelink control information;
    receiving, by the first terminal, a second indication indicating a second resource set including a resource in the first resource set that satisfies or does not satisfy a first condition; and
    triggering, by the first terminal, resource reselection according to the second resource set;
    wherein the first condition comprises resources in the first resource set resulting in overlapping resources between transmission resources of the first terminal and a third resource set,
    wherein the third resource set is a resource set determined according to the resource indicated in the sidelink control information detected by the second terminal.

2. The method according to claim 1, wherein the first condition further comprises:
    resources in the first resource set resulting in overlapping resources between the transmission resources of the first terminal and transmission resources of the second terminal.

3. The method according to claim 2, wherein the first condition further comprises at least one of:
    Sidelink Reference Signal Received Power (SL-RSRP) of a Physical Sidelink Control Channel (PSCCH) where the sidelink control information detected by the second terminal is located being greater than or equal to an RSRP threshold;
    SL-RSRP of a PSSCH scheduled by the PSCCH being greater than or equal to a RSRP threshold; or
    a priority in the sidelink control information detected by the second terminal being higher than a priority of data to be transmitted by the first terminal.

4. The method according to claim 2, wherein:
    the transmission resources of the first terminal are the resources in the first resource set.

5. The method according to claim 1, wherein the first indication is carried in sidelink control information in a PSCCH transmitted by the first terminal.

6. The method according to claim 1, wherein the first indication comprises a first frequency domain indication and a first time domain indication,
    wherein the first frequency domain indication indicates a frequency domain position of each resource in the first resource set, and the first time domain indication indicates a time domain position of each resource in the first resource set.

7. The method according to claim 6, wherein the first frequency domain indication is an absolute indication or a relative indication relative to a predetermined frequency domain position, and the first time domain indication is an absolute indication or a relative indication relative to a predetermined time domain position.

8. The method according to claim 1, wherein the first indication is transmitted at time at which the first terminal transmits a PSSCH.

9. The method according to claim 1, wherein the second indication is transmitted at any of:
    any time before a fourth time, the fourth time being a time corresponding to a resource in the first resource set that satisfies the first condition and has a lowest time domain position; or
    any time before a fifth time, the fifth time being a difference between the fourth time and a first time period.

10. The method according to claim 1, further comprising:
    transmitting, by the first terminal, first information to the second terminal, the first information comprising at least one of: a resource reservation period of the first terminal, or a priority of data to be transmitted by the first terminal.

11. The method according to claim 10, wherein a time at which the first information is transmitted and a time at which the first indication is transmitted are same.

12. The method according to claim 10, wherein a scheme for carrying the first information and a scheme for carrying the first indication are same.

13. A wireless communication method, comprising:
    receiving, by a second terminal, a first indication transmitted by a first terminal, the first indication indicating a first resource set comprising a time-frequency resource selected by the first terminal or a time-frequency resource indicated by the first terminal via sidelink control information;
    determining, by the second terminal, a second resource set comprising a resource in the first resource set that satisfies or does not satisfy a first condition; and
    transmitting, by the second terminal, a second indication to the first terminal, the second indication indicating the second resource set;
    wherein the first condition comprises resources in the first resource set resulting in overlapping resources between transmission resources of the first terminal and a third resource set,
    wherein the third resource set is a resource set determined according to the resource indicated in the sidelink control information detected by the second terminal.

14. The method according to claim 13, wherein the first condition further comprises:
    resources in the first resource set resulting in overlapping resources between the transmission resources of the first terminal and transmission resources of the second terminal.

15. The method according to claim 14, wherein the first condition further comprises at least one of:
  Sidelink Reference Signal Received Power (SL-RSRP) of a Physical Sidelink Control Channel (PSCCH) where the sidelink control information detected by the second terminal is located being greater than or equal to an RSRP threshold;
  SL-RSRP of a PSSCH scheduled by the PSCCH being greater than or equal to a RSRP threshold; or
  a priority in the sidelink control information detected by the second terminal being higher than a priority of data to be transmitted by the first terminal.

16. The method according to claim 14, wherein:
  the transmission resources of the first terminal are the resources in the first resource set.

17. The method according to claim 13, wherein the first indication is carried in sidelink control information in a PSCCH transmitted by the first terminal.

18. The method according to claim 13, wherein the first indication comprises a first frequency domain indication and a first time domain indication,
  wherein the first frequency domain indication indicates a frequency domain position of each resource in the first resource set, and the first time domain indication indicates a time domain position of each resource in the first resource set.

19. A terminal, comprising a processor and a memory, wherein the memory stores a computer program, and the processor is configured to invoke and execute the computer program stored in the memory to:
  transmit a first indication to a second terminal, the first indication indicating a first resource set comprising a time-frequency resource selected by the terminal or a time-frequency resource indicated by the terminal via sidelink control information;
  receive a second indication indicating a second resource set including a resource in the first resource set that satisfies or does not satisfy a first condition; and
  trigger resource reselection according to the second resource set;
  wherein the first condition comprises resources in the first resource set resulting in overlapping resources between transmission resources of a first terminal and a third resource set,
  wherein the third resource set is a resource set determined according to the resource indicated in the sidelink control information detected by the second terminal.

20. A terminal, comprising a processor and a memory, wherein the memory stores a computer program, and the processor is configured to invoke and execute the computer program stored in the memory to perform the method according to claim 13.

* * * * *